US012162113B2

(12) United States Patent
Matsubara et al.

(10) Patent No.: US 12,162,113 B2
(45) Date of Patent: Dec. 10, 2024

(54) TOOL WITH ACCESSORY DETECTION

(71) Applicant: MAKITA CORPORATION, Anjo (JP)

(72) Inventors: Takashi Matsubara, Anjo (JP); Shunpei Yamaji, Anjo (JP); Akira Mizutani, Anjo (JP); Ryosuke Otani, Anjo (JP); Hiroki Kaneko, Anjo (JP)

(73) Assignee: MAKITA CORPORATION, Anjo (JP)

( * ) Notice: Subject to any disclaimer, the term of this patent is extended or adjusted under 35 U.S.C. 154(b) by 952 days.

(21) Appl. No.: 17/273,439

(22) PCT Filed: Sep. 6, 2019

(86) PCT No.: PCT/JP2019/035259
§ 371 (c)(1),
(2) Date: Mar. 4, 2021

(87) PCT Pub. No.: WO2020/054631
PCT Pub. Date: Mar. 19, 2020

(65) Prior Publication Data

US 2021/0220959 A1 Jul. 22, 2021

(30) Foreign Application Priority Data

Sep. 14, 2018 (JP) ................................ 2018-172611

(51) Int. Cl.
*B24B 23/00* (2006.01)
*B24B 23/02* (2006.01)
(Continued)

(52) U.S. Cl.
CPC ............ *B24B 23/005* (2013.01); *B24B 23/02* (2013.01); *B24B 55/052* (2013.01); *B25F 5/02* (2013.01)

(58) Field of Classification Search
CPC ....... B25F 5/02; B23Q 11/0085; B23Q 11/08; B24B 55/04; B24B 55/05–057; B24B 23/02; B24B 49/12
(Continued)

(56) References Cited

U.S. PATENT DOCUMENTS 6,742,601 B2 * 6/2004 Numata .................... B25F 5/00 173/217
7,722,444 B2 * 5/2010 Gallagher ............. B24B 45/006 451/344
(Continued)

FOREIGN PATENT DOCUMENTS

CN 101468464 A 7/2009
CN 104889457 A 9/2015
(Continued)

OTHER PUBLICATIONS

WO-2017051893-A1 machine translation, Mar. 30, 2017 (Year: 2017).*
(Continued)

*Primary Examiner* — Brian D Keller
*Assistant Examiner* — Marcel T Dion
(74) *Attorney, Agent, or Firm* — J-TEK LAW PLLC; Jeffrey D. Tekanic; Scott T. Wakeman

(57) ABSTRACT

A power tool, such as a grinder, may include: a prime mover such as a motor; a power-transmission mechanism operably connected to the prime mover; a housing that houses the prime mover and the power-transmission mechanism; and a tool-accessory retaining part for holding a tool accessary. The tool-accessory retaining part is operably connected to the power-transmission mechanism. An accessory is mounted on the housing in a detachable manner. A link member moves in response to mounting and demounting of the accessory. A detection sensor is housed in an interior of
(Continued)

the housing and includes a non-contact sensor device. The detection sensor is configured to detect movement of the link member using the non-contact sensor device.

19 Claims, 21 Drawing Sheets

(51) Int. Cl.
*B24B 55/05* (2006.01)
*B25F 5/02* (2006.01)

(58) Field of Classification Search
USPC .................... 451/6, 344, 358, 359, 442, 451
See application file for complete search history.

(56) References Cited

U.S. PATENT DOCUMENTS

| | | | | |
|---|---|---|---|---|
| 8,151,679 | B2 | 4/2012 | Bohne | |
| 8,905,822 | B2 | 12/2014 | Meyer | |
| 10,821,570 | B2 | 11/2020 | Tomonaga et al. | |
| 2003/0176147 | A1 | 9/2003 | Krondorfer et al. | |
| 2005/0161241 | A1 | 7/2005 | Frauhammer et al. | |
| 2008/0014844 | A1 | 1/2008 | Pontieri | |
| 2009/0019899 | A1* | 1/2009 | Boeck | B24B 23/00 70/61 |
| 2009/0160371 | A1 | 6/2009 | Inagaki et al. | |
| 2010/0316457 | A1* | 12/2010 | Wasielewski | B25F 5/02 408/238 |
| 2011/0025207 | A1* | 2/2011 | Nagasaka | B25B 23/18 315/76 |
| 2013/0023189 | A1* | 1/2013 | Numata | B23Q 11/0092 451/344 |
| 2013/0162188 | A1* | 6/2013 | Koeder | B23B 45/001 318/434 |
| 2015/0014005 | A1* | 1/2015 | Puzio | B25F 5/003 173/2 |
| 2016/0178432 | A1 | 6/2016 | Masakawa | |
| 2016/0273581 | A1 | 9/2016 | Wallmeier et al. | |
| 2017/0072532 | A1 | 3/2017 | Kawakami et al. | |
| 2017/0072533 | A1 | 3/2017 | Yoshizaki et al. | |
| 2017/0072534 | A1 | 3/2017 | Nakamura et al. | |
| 2017/0072535 | A1 | 3/2017 | Iwakami et al. | |
| 2017/0125192 | A1 | 5/2017 | Hanai et al. | |
| 2018/0272494 | A1* | 9/2018 | Schadow | B25F 5/026 |
| 2018/0281146 | A1 | 10/2018 | Tomonaga et al. | |
| 2018/0366286 | A1* | 12/2018 | Moreland, IV | H01H 21/10 |
| 2019/0168371 | A1* | 6/2019 | Aoki | B27B 19/006 |
| 2019/0247973 | A1* | 8/2019 | Zhong | B24B 55/00 |
| 2021/0220959 | A1 | 7/2021 | Matsubara et al. | |

FOREIGN PATENT DOCUMENTS

| | | | | |
|---|---|---|---|---|
| CN | 105710714 | A | 6/2016 | |
| JP | S5855847 | U | 4/1983 | |
| JP | 2012061541 | A | 3/2012 | |
| WO | 2017051892 | A1 | 3/2017 | |
| WO | WO-2017051893 | A1 * | 3/2017 | B24B 23/02 |
| WO | 2020054631 | A1 | 3/2020 | |

OTHER PUBLICATIONS

Office Action from the Chinese Patent Office dispatched Jun. 28, 2022 in related Chinese Patent Application No. 201980060062.2, and machine translation thereof.
Office Action from the Japanese Patent Office dispatched Nov. 28, 2023, in related Japanese Patent Application No. 2022-133606; and machine translation thereof.
English translation of International Search Report mailed Nov. 26, 2019 in parent application No. PCT/JP2019/035259.
English translation of Written Opinion in parent application No. PCT/JP2019/035259.

* cited by examiner

TOOL WITH ACCESSORY DETECTION

CROSS-REFERENCE

This application is the US national stage of International Patent Application No. PCT/JP2019/035259 filed on Sep. 6, 2019, which claims priority to Japanese Patent Application 2018-172611 filed on Sep. 14, 2018.

TECHNICAL FIELD

The techniques disclosed in the present specification relate to a tool.

BACKGROUND ART

PCT International Publication No. WO2017/051893 discloses a tool comprising: a prime mover; a power-transmission mechanism, which is connected to the prime mover; a housing, which houses the prime mover and the power-transmission mechanism; a tool-accessory retaining part, which is connected to the power-transmission mechanism and holds a tool accessory; an accessory, which is mounted on the housing in a detachable manner; and a detection sensor, which is provided on an outer portion of the housing. In this tool, the detection sensor can detect whether the accessory is mounted on the housing.

SUMMARY OF THE INVENTION

Tools like the one mentioned above are used in environments in which the air contains a large amount of dust. In such a situation, if the detection sensor is provided on the outer portion of the housing, there is a risk that the detection sensor will make a mistaken detection owing to the effects of the dust. There are expectations of a technique that is capable of accurately detecting whether the accessory is mounted on the housing-even in the situation in which the tool is being used in an environment having a large amount of dust.

The present specification discloses a tool. The tool may comprise: a prime mover; a power-transmission mechanism connected to the prime mover; a housing that houses the prime mover and the power-transmission mechanism; a tool-accessory retaining part connected to the power-transmission mechanism and that holds a tool accessory; an accessory mounted on the housing in a detachable manner; a link member that moves in response to the mounting and demounting of the accessory; and a detection sensor housed in the interior of the housing and comprising a non-contact-type sensor device. The detection sensor may, using the sensor device, detect the movement of the link member.

According to the above-mentioned configuration, because the detection sensor is housed in the interior of the housing, the detection sensor tends not to be affected by dust. Accordingly, even in the situation in which the tool is used in an environment having a large amount of dust, it is possible to accurately detect whether the accessory is mounted on the housing. In addition, according to the above-mentioned configuration, the detection sensor detects the movement of the link member using the non-contact-type sensor device. Thereby, even in the situation in which vibration, an impact, or the like acts on the link member, it is possible to prevent the impact, vibration, or the like from acting on the sensor device via the link member. Erroneous detection by the sensor device due to an impact, vibration, or the like can be prevented, and the durability of the sensor device can be improved.

The present specification also discloses another tool. The tool may comprise: a prime mover; a power-transmission mechanism connected to the prime mover; a housing that houses the prime mover and the power-transmission mechanism; a tool-accessory retaining part connected to the power-transmission mechanism and that holds a tool accessory; an accessory mounted on the housing in a detachable manner; a link member that moves in response to the mounting and demounting of the accessory; and a detection sensor, which is housed in the interior of the housing. The link member may pivot relative to the housing in response to the mounting and demounting of the accessory. The detection sensor may detect the pivoting movement of the link member.

According to the above-mentioned configuration, because the detection sensor is housed in the interior of the housing, the detection sensor tends not to be affected by dust. Accordingly, even in the situation in which the tool is used in an environment containing a large amount of dust, it is possible to accurately detect whether the accessory is mounted on the housing. In addition, according to the above-mentioned configuration, even in the situation in which the detection sensor is disposed at a location spaced apart from a mounting position of the accessory, there is no need to make the link member a large, complicated mechanism, and the link member, which extends from the mounting position of the accessory to the location of the detection sensor, can be disposed utilizing empty space in the interior of the housing.

DETAILED DESCRIPTION

Figure 1:
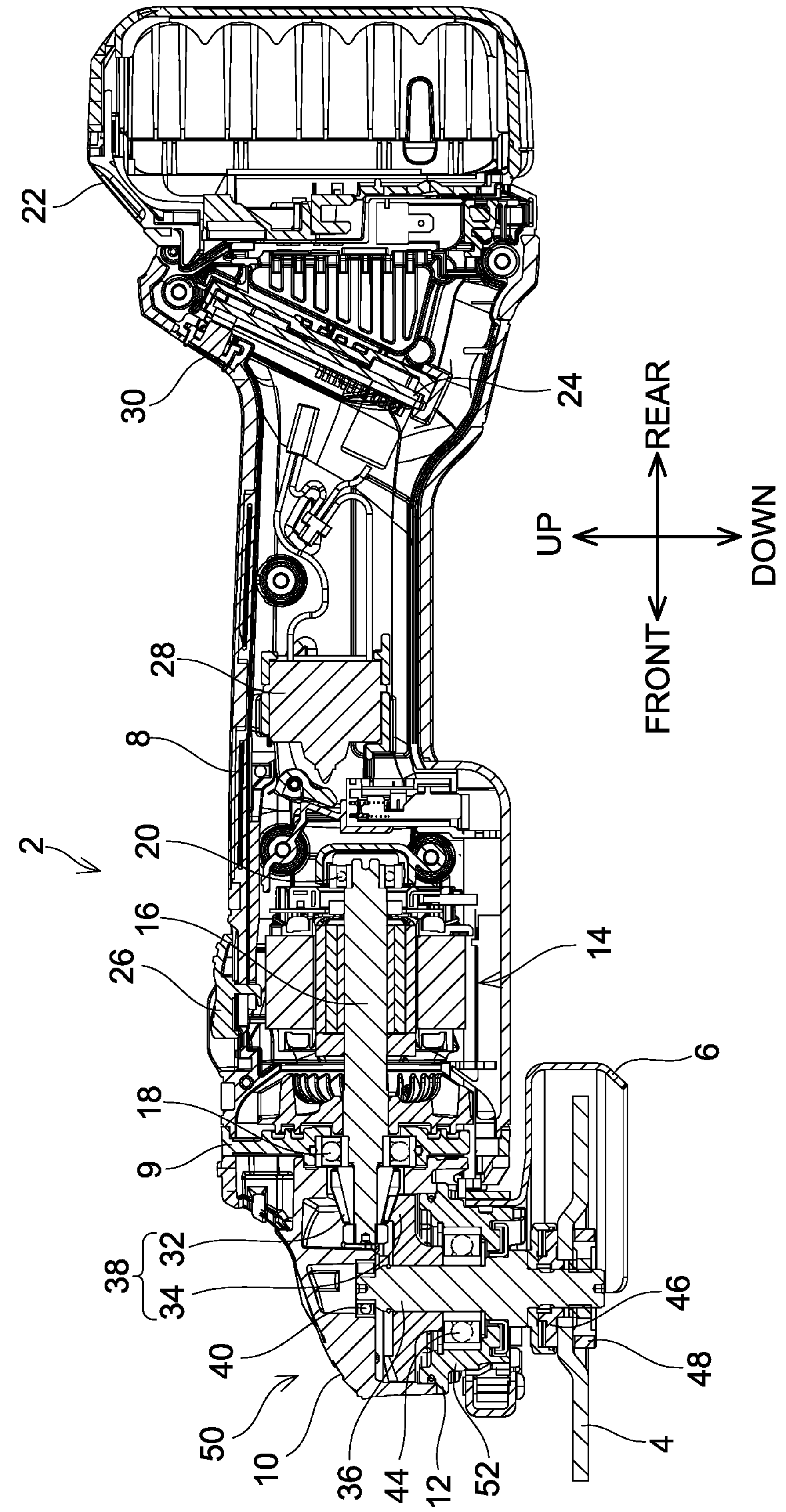
FIG. 1 is a longitudinal, cross-sectional view of a grinder 2 according to Working Example 1.

Non-limiting concrete examples are described below in detail with reference to the drawings. This detailed description is merely intended to teach a person of skill in the art details for practicing preferred examples of the present invention and is not intended to limit the scope of the present invention. In addition, each of the additional features and inventions disclosed below may be used separately or in conjunction with other features and inventions to provide a further improved tool, method of manufacturing the same, and method of using the same.

Moreover, combinations of features and steps disclosed in the below detailed description are not essential to practice the invention in the broadest sense and are instead described merely to particularly describe representative concrete examples of the present inventions. Furthermore, the various features of the representative concrete examples described above and below, as well as the various features described in the independent and dependent claims, do not have to be combined as in the concrete examples described herein or in the illustrated order in order to provide additional useful embodiments of the present invention.

All features described in the present specification and/or the claims are intended to be disclosed separately and independently of one another for the purpose of original written disclosure, as well as for the purpose of restricting the claimed subject matter, independent of the compositions of the features described in the embodiments and/or the claims. In addition, all value ranges, or indications of groups and collections, are intended to disclose every possible intermediate value or indication for the purpose of original written disclosure, as well as for the purpose of restricting the claimed subject matter.

In one or more of the embodiments, a tool may comprise: a prime mover; a power-transmission mechanism connected to the prime mover; a housing that houses the prime mover and the power-transmission mechanism; a tool-accessory retaining part connected to the power-transmission mechanism and that holds a tool accessory; an accessory mounted on the housing in a detachable manner; a link member that moves in response to the mounting and demounting of the accessory; and a detection sensor housed in the interior of the housing and comprising a non-contact-type sensor device. The detection sensor may, using the sensor device, detect the movement of the link member.

According to the above-mentioned configuration, because the detection sensor is housed in the interior of the housing, the detection sensor tends not to be affected by dust. Accordingly, even in the situation in which the tool is used in an environment having a large amount of dust, it is possible to accurately detect whether the accessory is mounted on the housing. In addition, according to the above-mentioned configuration, the detection sensor detects the movement of the link member using the non-contact-type sensor device. Thereby, even in the situation in which vibration, an impact, or the like acts on the link member, it is possible to prevent the impact, vibration, or the like from acting on the sensor device via the link member. Erroneous detection by the sensor device due to an impact, vibration, or the like can be prevented, and the durability of the sensor device can be improved.

In one or more of the embodiments, the tool may further comprise a control unit, which controls the operation of the prime mover. The control unit may permit, based on a detection signal from the detection sensor, the driving of the prime mover.

According to the above-mentioned configuration, the driving of the prime mover can be permitted only in the situation in which the accessory is mounted on the housing.

In one or more of the embodiments, the link member may extend from the interior to the outside of the housing.

According to the above-mentioned configuration, it is possible to detect whether the accessory, which does not enter the interior of the housing when mounted on the housing, is mounted on the housing.

In one or more of the embodiments, the detection sensor may further comprise: a sensor case, which houses the sensor device; and a sensor lever, which extends from the interior to the outside of the sensor case and moves in response to the movement of the link member. The sensor device may detect the movement of the sensor lever.

According to the above-mentioned configuration, because the sensor device of the detection sensor is housed in the interior of the sensor case, even in the hypothetical situation in which dust has flowed into the interior of the housing, the effect of the dust on the sensor device can be curtailed.

In one or more of the embodiments, the sensor device may comprise a light-emitting device and a light-receiving device, which receives light from the light-emitting device. The sensor lever may be movable between a first position, at which a space between the light-emitting device and the light-receiving device is not blocked, and a second position, at which the space between the light-emitting device and the light-receiving device is blocked. In the situation in which the accessory is not mounted on the housing, the sensor lever may be positioned at one of the first position and the second position. In the situation in which the accessory is mounted on the housing, the sensor lever may be positioned at the other of the first position and the second position.

Compared with, for example, a sensor device that comprises a magnet and a Hall-effect device, a sensor device that comprises the light-emitting device and the light-receiving device as described above tends not to be affected by the outside environment, such as an environment containing metallic powder. According to the above-mentioned configuration, because the position of the sensor lever changes between the first position and the second position in response to the mounting and demounting of the accessory, it is possible to determine whether the accessory is mounted on the housing based on the presence or absence of the transmission of light from the light-emitting device to the light-receiving device.

In one or more of the embodiments, the light-emitting device may emit light based on an emit-light signal having a prescribed signal pattern.

Regarding the configuration in which the position of the sensor lever changes between the first position and the second position in response to the mounting and demounting of the accessory, if an attempt were to be made to determine whether the accessory is mounted on the housing based simply on the presence or absence of the transmission of light from the light-emitting device to the light-receiving device, then there is a risk that, in the situation in which an ON malfunction, an OFF malfunction, or the like has occurred in the light-receiving device, a mistaken determination of whether the accessory is mounted on the housing will be made. According to the above-mentioned configuration, in the situation in which the sensor lever is at the first position and light is being transmitted normally from the light-emitting device to the light-receiving device, the light-reception signal at the light-receiving device has the same signal pattern as that of the emit-light signal at the light-emitting device. Consequently, by comparing the signal pattern of the light-reception signal at the light-receiving device and the signal pattern of the emit-light signal at the light-emitting device, it can be determined whether the accessory is mounted on the housing, and therefore a mistaken determination due to a fault in the detection sensor can be prevented.

In one or more of the embodiments, the sensor lever may be formed into a shape such that it is slidable along an inner-side side surface of the sensor case. The sensor lever may comprise: a base part having a longitudinal direction in the up-down direction, a latitudinal direction in the front-rear direction, and having substantially a flat-sheet shape; and a contact part, which protrudes from the sensor case and makes contact with the link member. A notched part, which has a shape that does not block the space between the light-emitting device and the light-receiving device, and a blocking part, which has a shape that blocks the space between the light-emitting device and the light-receiving device, may be formed on the base part.

According to the above-mentioned configuration, the sensor lever, which extends from the interior to the outside of the sensor case and moves in response to the movement of the link member, can be implemented using a simple configuration.

In one or more of the embodiments, the accessory may comprise a cover that at least partially covers the tool accessory. The housing may comprise a cover-mounting part, on which the cover is mounted. The link member may comprise: a round-rod-shaped shaft; a forward lever fixed to a front end of the shaft; and a rearward lever fixed to a rear end of the shaft. The front end of the shaft may protrude to the outside of the housing via a through hole formed in the housing. The forward lever may be disposed, outside of the housing, in the vicinity of the cover-mounting part. The rearward lever may be disposed, in the interior of the housing, downward of the detection sensor.

According to the above-mentioned configuration, the link member, which causes the sensor lever to move in response to the mounting and demounting of the cover that is the accessory, can be implemented using a simple configuration.

In one or more of the embodiments, the tool may be configured such that when the cover is mounted on the cover-mounting part, the forward lever is pressed by the cover and thereby pivots upward, the rearward lever also pivots upward, the contact part is pressed by the rearward lever, and the sensor lever moves upward, and thereby the notched part is disposed between the light-emitting device and the light-receiving device, and therefore light from the light-emitting device reaches the light-receiving device without being blocked.

According to the above-mentioned configuration, the detection sensor can, using a simple configuration, detect the mounting of the cover on and the demounting of the cover from the housing.

In one or more of the embodiments, the link member may be supported by the housing in a pivotable manner. The link member may pivot relative to the housing in response to the mounting and demounting of the accessory.

According to the above-mentioned configuration, even in the situation in which the detection sensor is disposed at a location spaced apart from a mounting position of the accessory, there is no need to make the link member a large, complicated mechanism, and the link member, which extends from the mounting position of the accessory to the location of the detection sensor, can be disposed utilizing empty space in the interior of the housing.

In one or more of the embodiments, the prime mover may be an electric motor. A longitudinal direction of the link member may be disposed in a first direction that is substantially parallel to an output shaft of the electric motor housed in the interior of the housing. A pivot shaft of the link member may be disposed in the first direction. The sensor lever may be held by the sensor case such that it is movable in a second direction, which is substantially orthogonal to the first direction. The detection sensor may further comprise an elastic member, which is housed in the interior of the sensor case and biases the sensor lever from the first position toward the second position.

According to the above-mentioned configuration, the configuration of the link member, the detection sensor, etc. can be simplified.

In one or more of the embodiments, the tool may further comprise the control unit, which controls the electric power supplied to the electric motor. The detection sensor may be disposed between the electric motor and the control unit.

According to the above-mentioned configuration, the detection sensor can be disposed utilizing empty space in the interior of the housing between the electric motor and the control unit.

In one or more of the embodiments, the tool may further comprise a battery, which is mounted on the housing in a detachable manner and supplies electric power to the electric motor. The detection sensor may be disposed between the electric motor and the battery.

According to the above-mentioned configuration, the detection sensor can be disposed utilizing empty space in the interior of the housing between the electric motor and the battery.

In one or more of the embodiments, the accessory may be a cover that at least partially covers the tool accessory.

According to the above-mentioned configuration, whether or not the cover, which at least partially covers the tool accessory, is mounted on the housing can be detected by the detection sensor.

In one or more of the embodiments, the detection sensor may further comprise a sensor case, which houses the sensor device. The link member may extend from the interior to the outside of the sensor case. The sensor device may detect the movement of the link member.

According to the above-mentioned configuration, because the sensor device directly detects the movement of the link member without going through a member, such as the sensor lever, the configuration of the detection sensor can be simplified, and the number of parts can be reduced.

In one or more of the embodiments, the sensor device may comprise a light-emitting device and a light-receiving device, which receives light from the light-emitting device. The link member may be movable between a first position, at which the space between the light-emitting device and the light-receiving device is not blocked, and a second position, at which the space between the light-emitting device and the light-receiving device is blocked. In the situation in which the accessory is not mounted on the housing, the link member may be positioned at one of the first position and the second position. In the situation in which the accessory is mounted on the housing, the link member may be positioned at the other of the first position and the second position.

According to the above-mentioned configuration, compared with the situation in which, for example, a sensor device comprising a magnet and a Hall-effect device is used, it is possible to make it such that the sensor device tends not to be affected by the outside environment, such as an environment containing metallic powder.

In one or more of the embodiments, the light-emitting device may emit light based on an emit-light signal having a prescribed signal pattern.

According to the above-mentioned configuration, a mistaken determination due to a fault of the detection sensor can be prevented.

In one or more of the embodiments, the link member may comprise: a swing shaft, which is held by the sensor case in a swingable manner; a contact arm, which protrudes to the outside of the sensor case; and a detection arm, which is housed in the interior of the sensor case. The contact arm may comprise a flange and a protruding part, which protrudes from the flange. The detection arm may comprise a blocking part, which has a shape that blocks the space between the light-emitting device and the light-receiving device.

According to the above-mentioned configuration, the link member, which moves in response to the mounting and demounting of the accessory, and the detection sensor, which detects the movement of the link member, can be implemented using a simple configuration.

In one or more of the embodiments, the accessory may comprise a cover that at least partially covers the tool accessory. The housing may comprise a cover-mounting part, on which the cover is mounted. The sensor case may be disposed, in the interior of the housing, in the vicinity of a center portion of the housing in the left-right direction. The sensor case may be held by the housing such that the swing shaft is disposed in the left-right direction and the protruding part faces downward. The contact arm may protrude to the outside of the housing via a through hole in the housing. The flange and the protruding part may be disposed, on outer portions of the housing, in the vicinity of the cover-mounting part.

According to the above-mentioned configuration, the detection sensor can, using a simple configuration, detect the mounting of the cover on and the demounting of the cover from the housing.

In one or more of the embodiments, the accessory may comprise a handle, which is grippable by a user. The housing may have a handle-mounting hole in which the handle is mounted. The sensor case may be disposed in the interior of the housing. The sensor case may be held by the housing such that the swing shaft is disposed in an up-down direction and the protruding part opposes the handle-mounting hole. In the situation in which the handle is not mounted in the handle-mounting hole, the flange may make contact with an inner surface of the housing, and the protruding part may enter the handle-mounting hole.

According to the above-mentioned configuration, the detection sensor can, using a simple configuration, detect the mounting of the handle on and the demounting of the handle from the housing.

In one or more of the embodiments, the link member may be supported by the sensor case in a pivotable manner. The link member may pivot relative to the sensor case in response to the mounting and demounting of the accessory.

Regarding the configuration in which the link member and the detection sensor are separately mounted on the housing, if an error were to occur at either of the mounting positions, then there is a risk that the relative positional relationship between the link member and the sensor device will differ from supposition, and thereby the detection sensor will adversely make a mistaken determination. According to the above-mentioned configuration, because the link member is mounted on the sensor case, the relative positional relationship between the link member and the sensor device can be accurately managed.

In one or more of the embodiments, the prime mover may be an electric motor. A pivot shaft of the link member and the sensor device may be disposed such that they are lined up in a direction that is substantially orthogonal to an output shaft of the electric motor housed in the interior of the housing.

According to the above-mentioned configuration, the link member and the detection sensor can be disposed utilizing empty space in the interior of the housing around the output shaft of the electric motor.

In one or more of the embodiments, the pivot shaft of the link member may be disposed in a second direction substantially orthogonal to a first direction, which is substantially parallel to the output shaft of the electric motor. The tool may further comprise an elastic member, which biases the link member from the first position toward the second position.

According to the above-mentioned configuration, the configuration of the link member, the detection sensor, etc. can be further simplified.

In one or more of the embodiments, the detection sensor may be disposed between the tool-accessory retaining part and the electric motor in the direction in which the output shaft of the electric motor extends.

According to the above-mentioned configuration, the detection sensor can be disposed utilizing empty space in the interior of the housing between the tool-accessory retaining part and the electric motor.

In one or more of the embodiments, the tool may comprise: a plurality of the detection sensors; and a plurality of the link members corresponding to the plurality of the detection sensors.

According to the above-mentioned configuration, in the situation in which a plurality of mounting positions of the accessory exists, whether the accessory is mounted at either of the mounting positions can be detected.

In one or more of the embodiments, the accessory may comprise the cover, which at least partially covers the tool accessory, and/or the handle, which is grippable by the user.

According to the above-mentioned configuration, whether the cover, which at least partially covers the tool accessory, the handle, which is grippable by the user, etc. is mounted on the housing can be detected by the detection sensor(s).

In one or more of the embodiments, a tool may comprise: a prime mover; a power-transmission mechanism connected to the prime mover; a housing that houses the prime mover and the power-transmission mechanism; a tool-accessory retaining part connected to the power-transmission mechanism and that holds a tool accessory; an accessory mounted on the housing in a detachable manner; a link member that moves in response to the mounting and demounting of the accessory; and a detection sensor, which is housed in the interior of the housing. The link member may pivot relative to the housing in response to the mounting and demounting of the accessory. The detection sensor may detect the pivoting movement of the link member.

According to the above-mentioned configuration, because the detection sensor is housed in the interior of the housing, the detection sensor tends not to be affected by dust. Accordingly, even in the situation in which the tool is used in an environment containing a large amount of dust, it is possible to accurately detect whether the accessory is mounted on the housing. In addition, according to the above-mentioned configuration, even in the situation in which the detection sensor is disposed at a location spaced apart from the mounting position of the accessory, there is no need to make the link member a large, complicated mechanism, and the link member, which extends from the mounting position of the accessory to the location of the detection sensor, can be disposed utilizing empty space in the interior of the housing.

In one or more of the embodiments, the tool may further comprise a control unit, which controls the operation of the prime mover. The control unit may permit, based on a detection signal from the detection sensor, the driving of the prime mover.

According to the above-mentioned configuration, the driving of the prime mover can be permitted only in the situation in which the accessory is mounted on the housing.

In one or more of the embodiments, the link member may be supported by the housing in a pivotable manner. The link member may extend from the interior to the outside of the housing.

According to the above-mentioned configuration, the link member, which extends from the mounting position of the accessory outside of the housing to the location of the detection sensor in the interior of the housing, can be disposed utilizing empty space in the interior of the housing.

Working Example 1

As shown in FIG. 1, grinder 2 of the present working example is a tool that is used in the state in which a grinding wheel 4, which is a tool accessory, and a cover 6, which is an accessory, are mounted. By rotating the grinding wheel 4, the grinder 2 can perform grinding, deburring, and the like of metal weld portions, and the like. In addition, by exchanging the grinding wheel 4 with one suited to the workpiece material and the work particulars, and by exchanging the cover 6 with one suited to the grinding wheel 4 after the exchanging, it is possible to perform cutting, etc. of the workpiece, such as concrete, a block, a brick, stone material, and the like. It is noted that, in the explanation below, the longitudinal direction of the grinder 2 is referred to as the front-rear direction, the rotational-axis direction of the grinding wheel 4 is referred to as the up-down direction, and the direction that is orthogonal to the front-rear direction and the up-down direction is referred to as the left-right direction.

The grinder 2 comprises a main-body housing 8, a gear-housing cover 9, a gear housing 10, and a bearing box 12.

An electric motor 14, which is a prime mover, is housed in the forward interior of the main-body housing 8. The electric motor 14 is, for example, an inner-rotor type, brushless DC motor. The electric motor 14 comprises an output shaft 16 extending in the front-rear direction. The output shaft 16 is supported by the gear-housing cover 9 in a rotatable manner via a bearing 18 and is supported by the main-body housing 8 in a rotatable manner via a bearing 20. A battery 22 is mounted on a rear end of the main-body housing 8. The battery 22 is, for example, a rechargeable secondary battery, such as a lithium-ion battery. The battery 22 is a sliding-type battery that is capable of being mounted and demounted by being slid in the up-down direction relative to the main-body housing 8. A control board 24 is housed in the rearward interior of the main-body housing 8. Electric power supplied from the battery 22 is supplied to the electric motor 14 via the control board 24. A slide switch 26, which is capable of being slid in the front-rear direction, is provided on a forward upper surface of the main-body housing 8. The slide switch 26 is switchable, by being manipulated by the user, between an ON position and an OFF position. The position of the slide switch 26 is detected by a main switch 28, which is housed in the interior of the main-body housing 8. The main switch 28 is connected to the control board 24. In the situation in which the slide switch 26 is in the ON position, electric power from the battery 22 is supplied to the electric motor 14 via the control board 24, and thereby the electric motor 14 causes the output shaft 16 to rotate. In the situation in which the slide switch 26 is in the OFF position, the supply of electric power from the battery 22 to the electric motor 14 is cut off, and thereby the electric motor 14 causes the output shaft 16 to stop. A display part 30 is provided on a rearward upper surface of the main-body housing 8. By changing the display in accordance with the operation state of the grinder 2, the remaining battery charge of the battery 22, or the like, the display part 30 alerts the user to the operation state of the grinder 2, the remaining battery charge of the battery 22, or the like.

Figure 2:
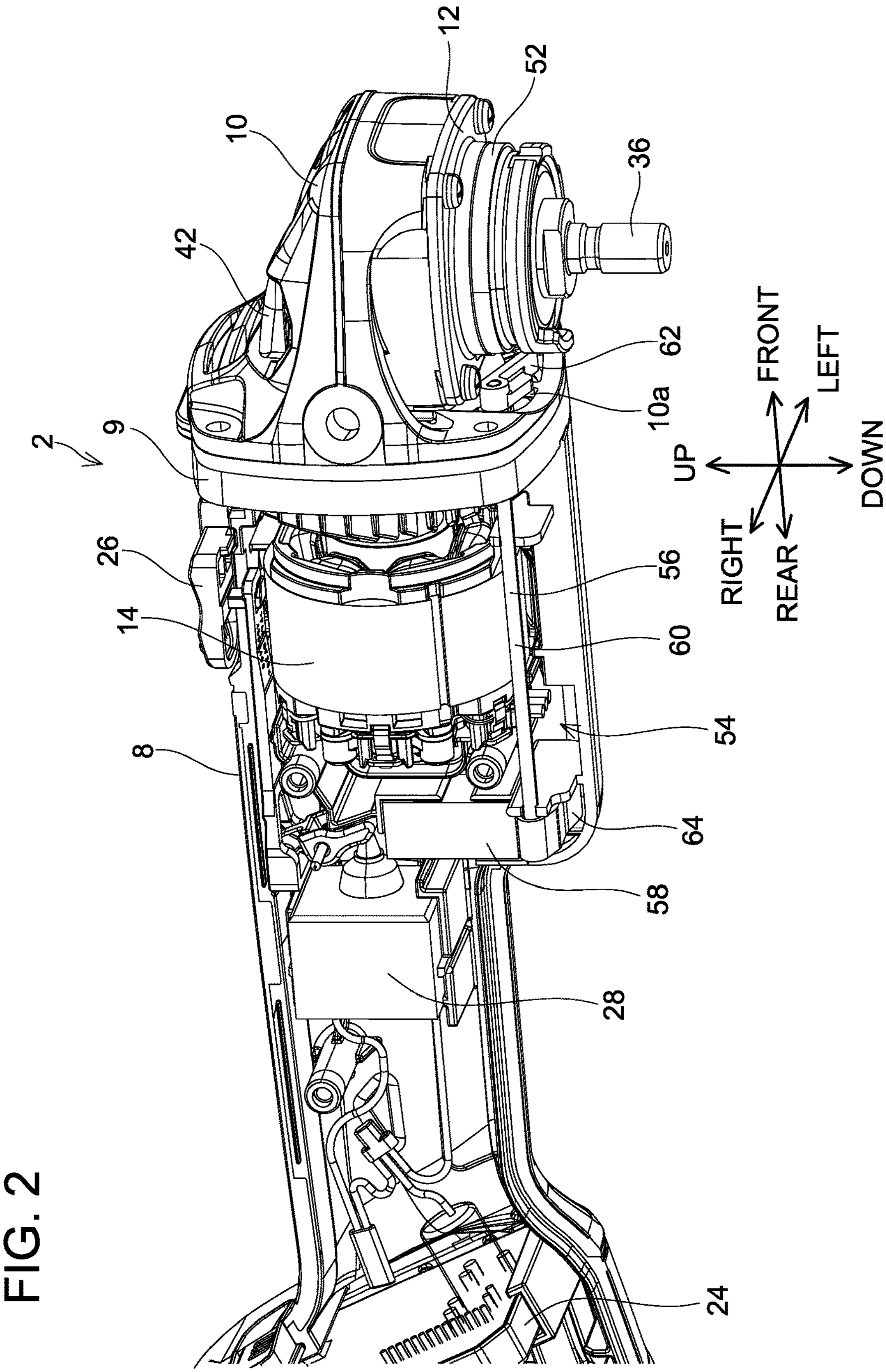
FIG. 2 is an oblique view that shows the structure of the interior of the grinder 2 according to Working Example 1.

The gear housing 10 is mounted forward of the main-body housing 8 via the gear-housing cover 9. A first bevel gear 32 and a second bevel gear 34, which are disposed such that they mesh with each another, are housed in the interior of the gear housing 10. The first bevel gear 32 is fixed to a forward end portion of the output shaft 16. The second bevel gear 34 is fixed to an upward end portion of a spindle 36, which extends in the up-down direction. Hereinbelow, the first bevel gear 32 and the second bevel gear 34 are collectively referred to simply as a bevel gear 38. The bevel gear 38 is a speed-reducing mechanism, which reduces the speed of the rotation of the electric motor 14 and transmits such rotation to the spindle 36, and can also be called a power-transmission mechanism. The gear housing 10 supports the upward end portion of the spindle 36 in a rotatable manner via a bearing 40. As shown in FIG. 2, a shaft lock 42 is provided on an upper surface of the gear housing 10. When the user presses in the shaft lock 42 downward, rotation of the second bevel gear 34 is prohibited, and thereby rotation of the spindle 36 is prohibited.

As shown in FIG. 1, the bearing box 12 is mounted downward of the gear housing 10. The bearing box 12 supports the spindle 36 in a rotatable manner via a bearing 44. The spindle 36 is rotatable, about a rotational axis extending in the up-down direction, relative to the bearing box 12. The grinding wheel 4 is mountable, via an inner flange 46 and an outer flange 48, on a downward end portion of the spindle 36. The inner flange 46 mates with the spindle 36. The grinding wheel 4 is mounted, from below the inner flange 46, on the spindle 36 and mates with the inner flange 46. The outer flange 48 is screwed, from the downward end portion of the spindle 36, onto the spindle 36, and the grinding wheel 4 is interposed and held between the outer flange 48 and the inner flange 46. With regard to the grinder 2, when the electric motor 14 rotates, the grinding wheel 4 rotates together with the spindle 36 about the rotational axis, and thereby grinding of the workpiece can be performed. The spindle 36 can also be referred to as the tool-accessory retaining part, which holds the grinding wheel 4, which is a tool accessory. It is noted that, in the explanation below, the main-body housing 8, the gear-housing cover 9, the gear housing 10, and the bearing box 12 are also collectively referred to simply as a housing 50.

The cover 6 is mounted on a cover-mounting part 52, which is formed on the bearing box 12 and has a substantially circular-cylinder shape. When the cover 6 is mounted on the grinder 2, the cover 6 forms a shape that at least partially covers the grinding wheel 4. When the cover 6 is mounted on the grinder 2, it can also be said that it has a shape that at least partially covers the spindle 36. When the grinding wheel 4 is grinding a workpiece, the cover 6 prevents cutting swarf from flying about toward the user side.

As shown in FIG. 2, the grinder 2 comprises a cover-detection mechanism 54. The cover-detection mechanism 54 comprises a link member 56 and a detection sensor 58. The detection sensor 58 is housed in the interior of the main-body housing 8. The detection sensor 58 is disposed between the electric motor 14 and the control board 24. The detection sensor 58 is disposed at a position that is rearward of the electric motor 14 and forward of the battery 22, the control board 24, etc.

Figure 3:
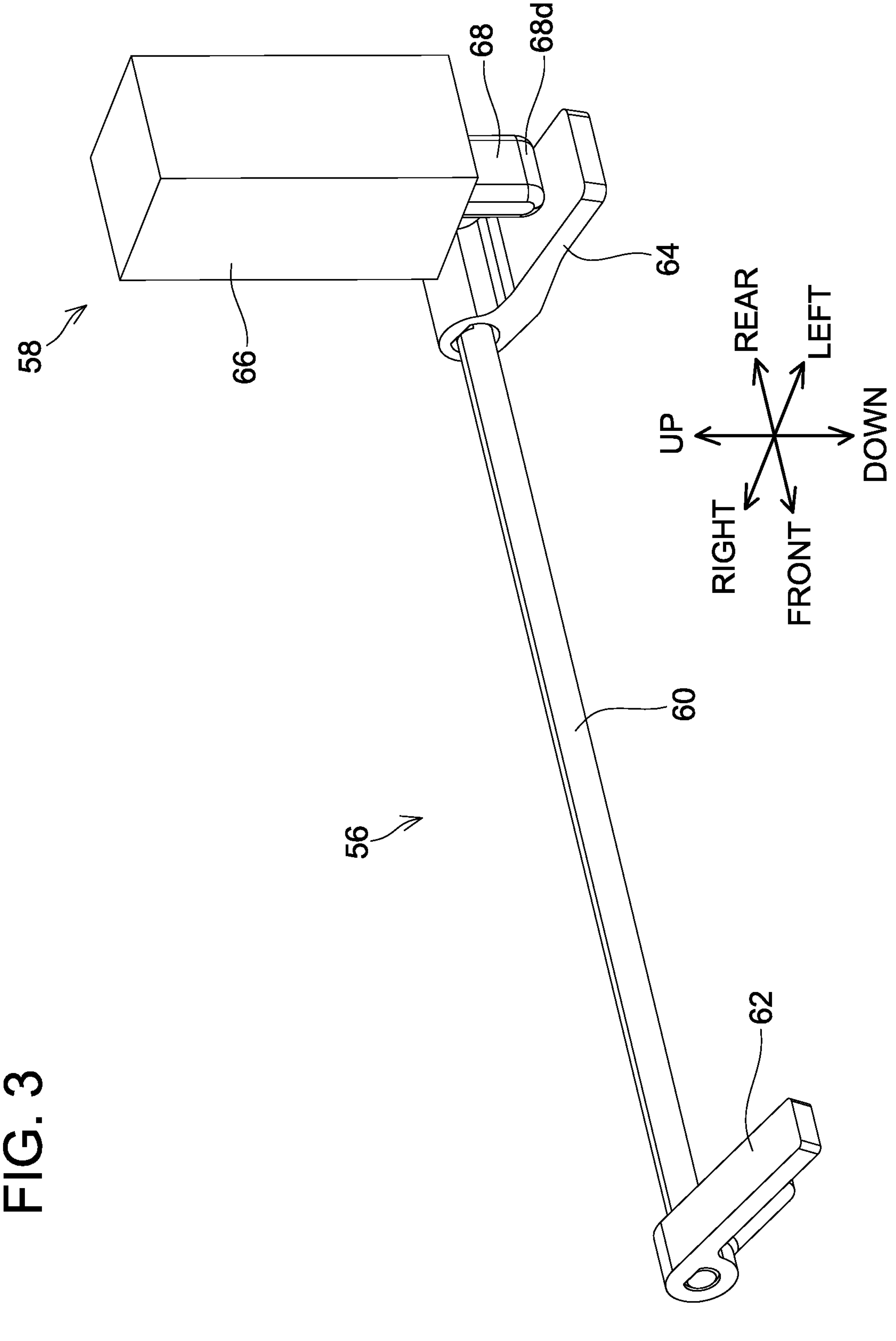
FIG. 3 is an oblique view of a cover-detection mechanism 54, in the state in which a cover 6 is not mounted, of the grinder 2 according to Working Example 1.

As shown in FIG. 3, the link member 56 comprises: a shaft (transmission member) 60, which has a round-rod shape; a forward lever 62, which is fixed to the front end of the shaft 60; and a rearward lever 64, which is fixed to the rear end of the shaft 60. As shown in FIG. 2, the shaft 60 is disposed forward, downward, and rightward of the interior of the main-body housing 8 such that the longitudinal direction of the shaft 60 extends in the front-rear direction of the grinder 2. The shaft 60 is supported by the main-body housing 8 so as to be pivotable about the longitudinal axis of the shaft 60. The front end of the shaft 60 protrudes to the outside of the housing 50 via a through hole 10*a*, which is formed in the gear housing 10; and the forward lever 62 is disposed outside of the housing 50. The forward lever 62 is disposed in the vicinity of the cover-mounting part 52 of the bearing box 12. The rearward lever 64 is disposed, in the interior of the main-body housing 8, downward of the detection sensor 58. When the cover 6 is mounted on the cover-mounting part 52, the forward lever 62 pivots upward. When the forward lever 62 pivots, the shaft 60 and the rearward lever 64 pivot integrally. As can be understood from viewing FIGS. 1 and 2 together, the frontmost end of the shaft (transmission member) 60 is disposed (located) forward of the frontmost end of the electric motor (prime mover) 14 in the front-rear direction; and the rearmost end of the shaft (transmission member) 60 is disposed (located) rearward of the rearmost end of the electric motor (prime mover) 14 in the front-rear direction. The shaft (transmission member) 60 and the output shaft 16 extend in parallel. The frontmost end of the output shaft 16 is disposed (located) forward of the frontmost end of the shaft (transmission member) 60.

Figure 4:
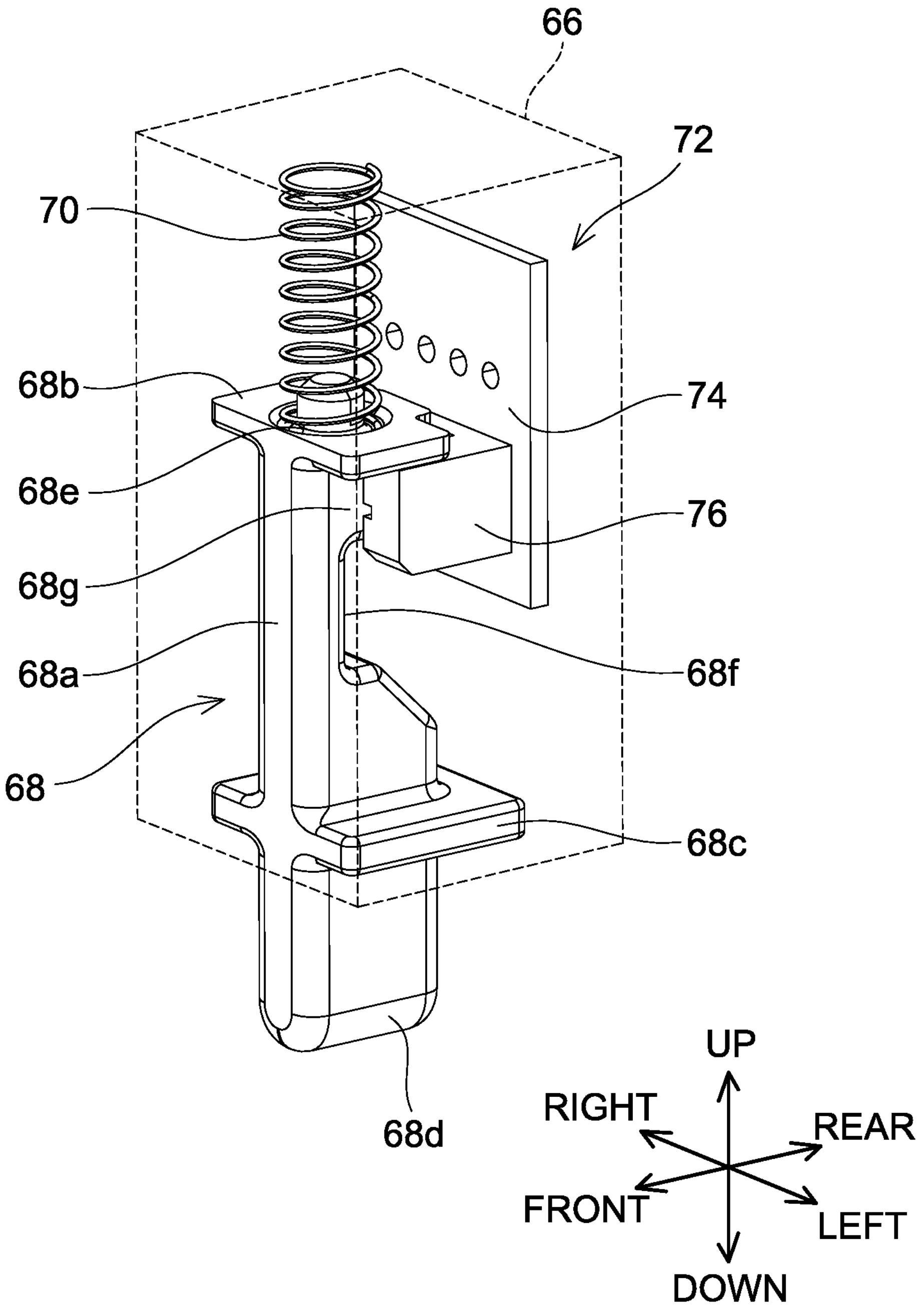
FIG. 4 is an oblique view that shows the structure of the interior of a detection sensor 58 of the grinder 2 according to Working Example 1.

As shown in FIG. 3 and FIG. 4, the detection sensor 58 comprises: a sensor case 66, which has a substantially rectangular-parallelepiped shape and has an opening in its lower surface; a sensor lever 68, a portion of which protrudes downward from the opening in the lower surface of the sensor case 66; a compression spring 70, which is housed inside the sensor case 66; and a photointerrupter 72, which is housed inside the sensor case 66. It is noted that, although not shown, a seal, which is made of rubber, makes contact with the perimeter of the sensor lever 68, and against which the sensor lever 68 is slidable, is provided in the opening of the lower surface of the sensor case 66. Thereby, it is possible to prevent dust from flowing into the interior of the sensor case 66.

Figure 5:
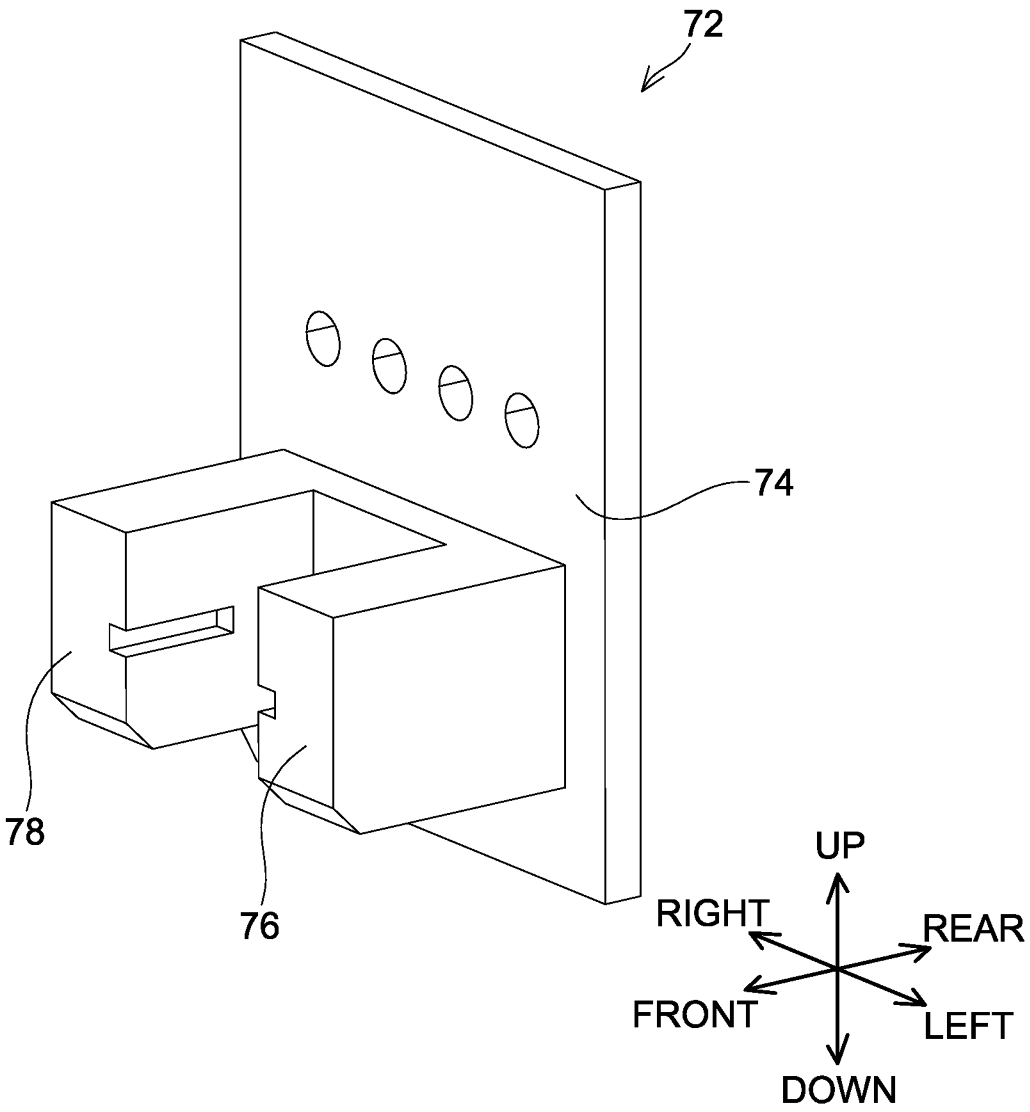
FIG. 5 is an oblique view of a photointerrupter 72 of the grinder 2 according to Working Example 1.

As shown in FIG. 5, the photointerrupter 72 comprises: a sensor board 74; and a light-emitting part 76 and a light-receiving part 78, which are installed on the sensor board 74. The sensor board 74 is fixed to a rearward side surface on the inner side of the sensor case 66. The sensor board 74 is connected to the control board 24 via wiring, which is not shown. The light-emitting part 76 and the light-receiving part 78 are disposed on a front surface of the sensor board 74. The light-emitting part 76 and the light-receiving part 78 are disposed opposing one another in the left-right direction. The light-emitting part 76 has a built-in light-emitting device 76*a* (refer to FIG. 10), and the light-receiving part 78 has a built-in light-receiving device 78*a* (refer to FIG. 10).

Figure 6:
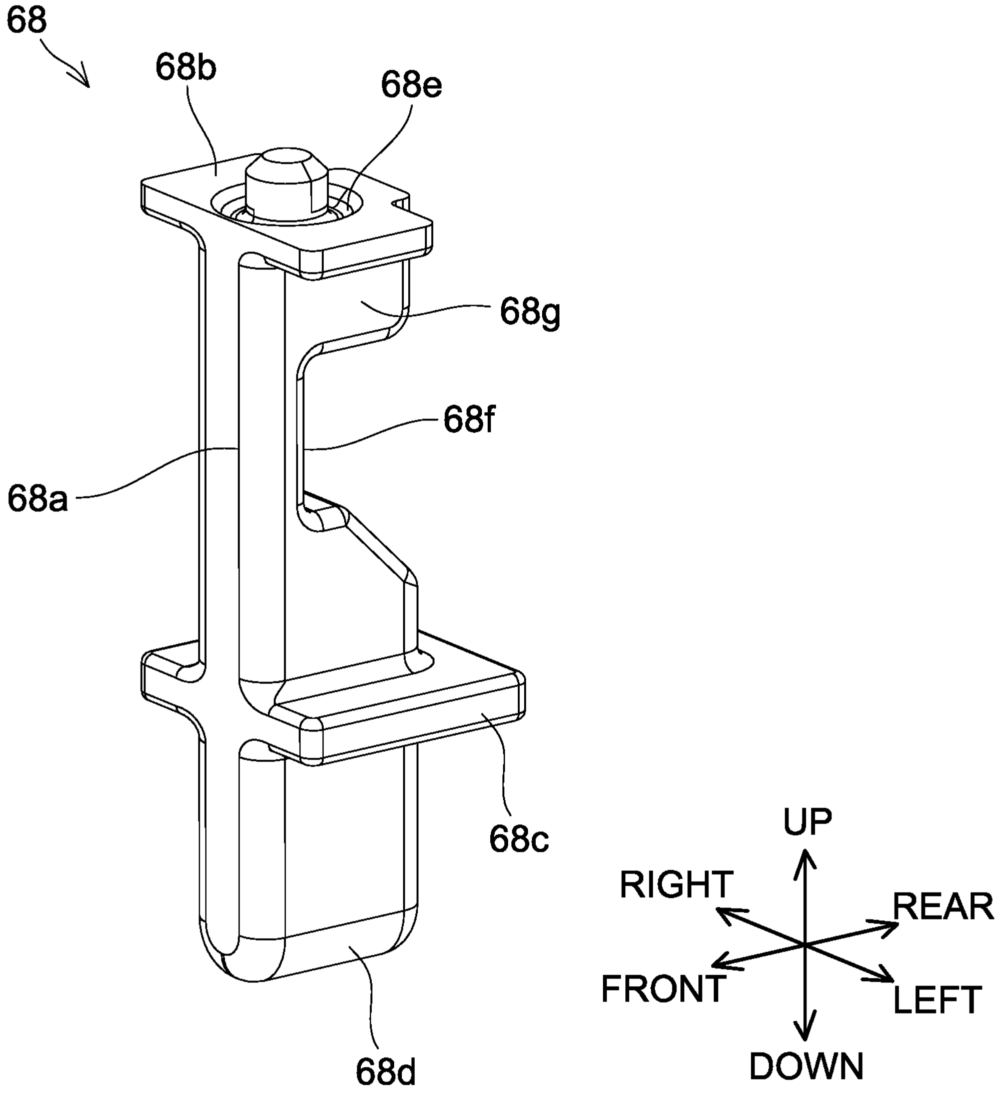
FIG. 6 is an oblique view of a sensor lever 68 of the grinder 2 according to Working Example 1.

As shown in FIG. 6, the sensor lever 68 comprises: a base part 68*a*, which has a substantially flat-sheet shape whose longitudinal direction is in the up-down direction and whose latitudinal direction is in the front-rear direction; an upper-side guide part 68*b*, which is provided on the upper end of the base part 68*a*; and a lower-side guide part 68*c*, which is provided at a location downward of the center of the base part 68*a* in the up-down direction. The upper-side guide part 68*b* and the lower-side guide part 68*c* are formed into a shape that is slidable relative to the inner-side side surface of the sensor case 66. A contact part 68*d*, which has a rounded shape, is formed on the lower end of the base part 68*a*. A spring-seat part 68*e* is formed on an upper surface of the upper-side guide part 68*b*. A notched part 68*f* is formed rearward of a location upward of the center of the base part 68*a* in the up-down direction. The base part 68*a* that is upward of the notched part 68*f* constitutes a blocking part 68*g*.

Figure 7:
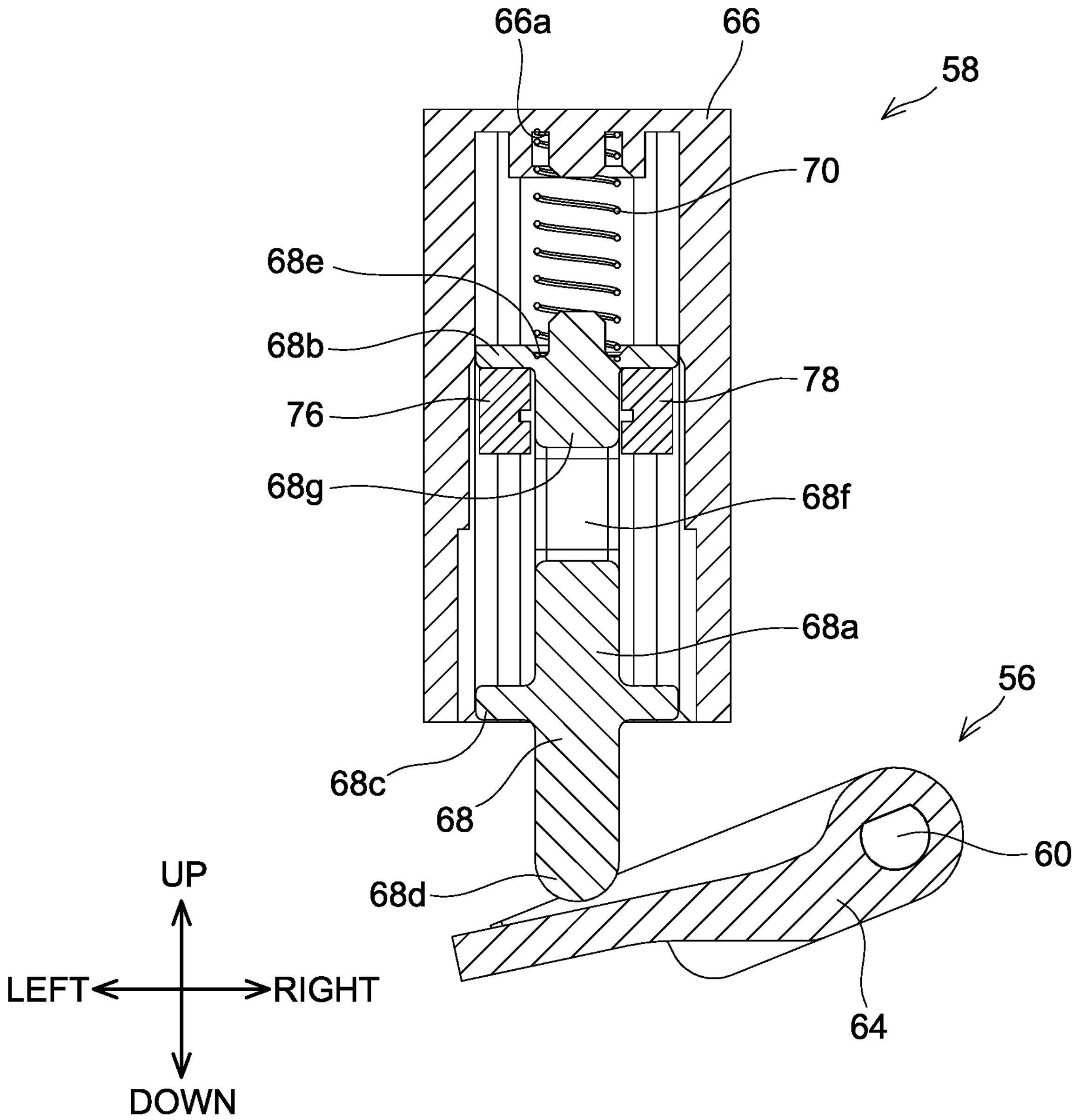
FIG. 7 is a longitudinal, cross-sectional view of the detection sensor 58, in the state in which the cover 6 is not mounted, of the grinder 2 according to Working Example 1.

As shown in FIG. 4, the compression spring 70 is disposed, in the interior of the sensor case 66, upward of the sensor lever 68. As shown in FIG. 7, the upper end of the compression spring 70 makes contact with a spring-seat part 66*a*, which is formed on an inner-side top surface of the sensor case 66, and the lower end of the compression spring 70 makes contact with the spring-seat part 68*e* of the sensor lever 68. The compression spring 70 biases the sensor lever 68 downward relative to the sensor case 66. The sensor lever 68 is movable downward as far as a lower-limit position at which a lower surface of the upper-side guide part 68*b* makes contact with upper surfaces of the light-emitting part 76 and the light-receiving part 78 of the photointerrupter 72. In the state in which the sensor lever 68 is at the lower-limit position, the blocking part 68*g* of the base part 68*a* is disposed between the light-emitting part 76 and the light-receiving part 78. In this state, light from the light-emitting part 76 is blocked by the blocking part 68*g* and therefore does not reach the light-receiving part 78.

As shown in FIG. 3, the rearward lever 64 of the link member 56 is located downward of the contact part 68*d* of the detection sensor 58. In the state in which the cover 6 is not mounted on the grinder 2 and therefore an external force does not act on the forward lever 62, an upward force from the rearward lever 64 does not act on the contact part 68*d*, and therefore the sensor lever 68 is maintained at the lower-limit position.

Figure 8:
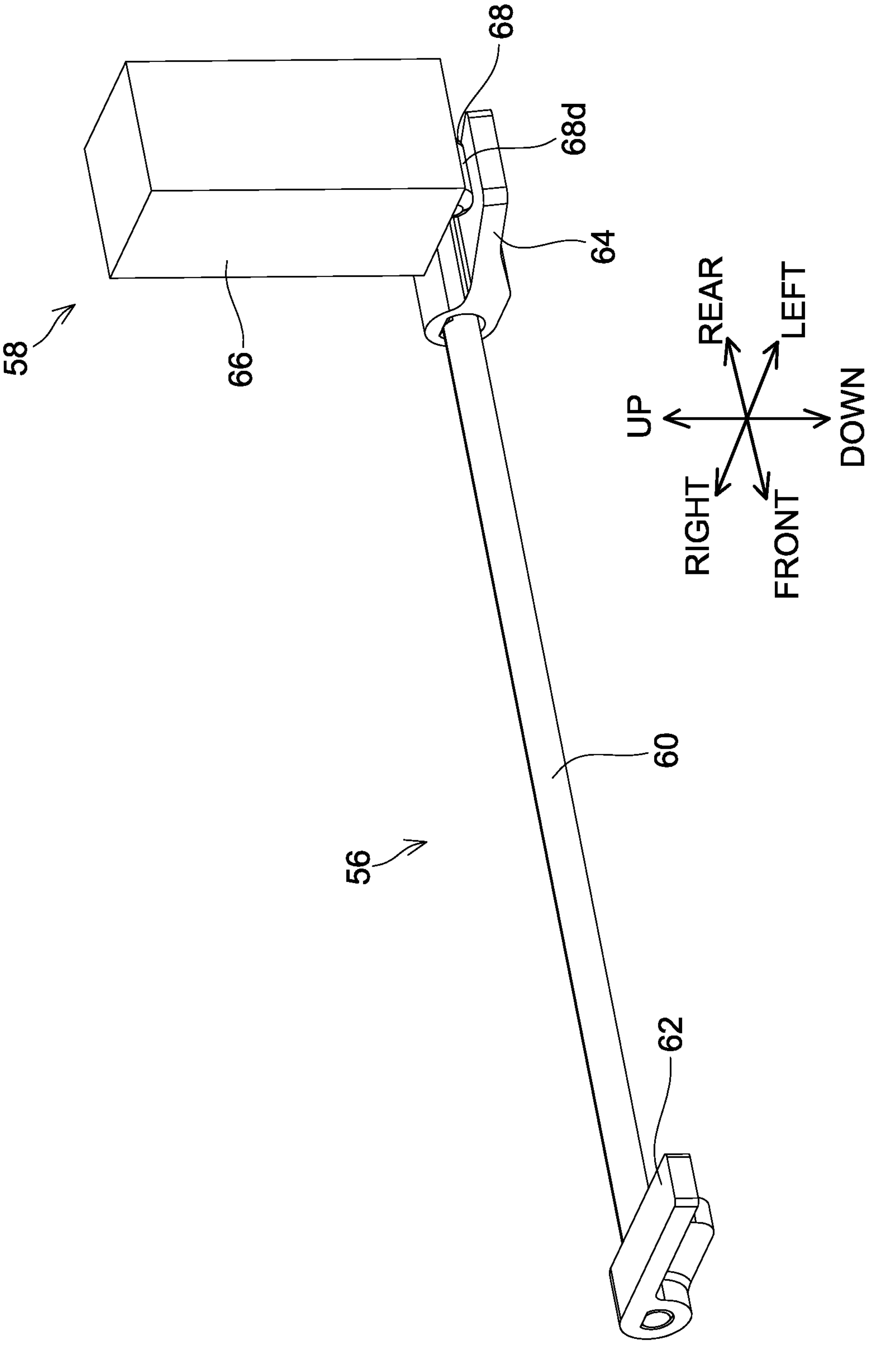
FIG. 8 is an oblique view of the cover-detection mechanism 54, in the state in which the cover 6 is mounted, of the grinder 2 according to Working Example 1.
Figure 9:
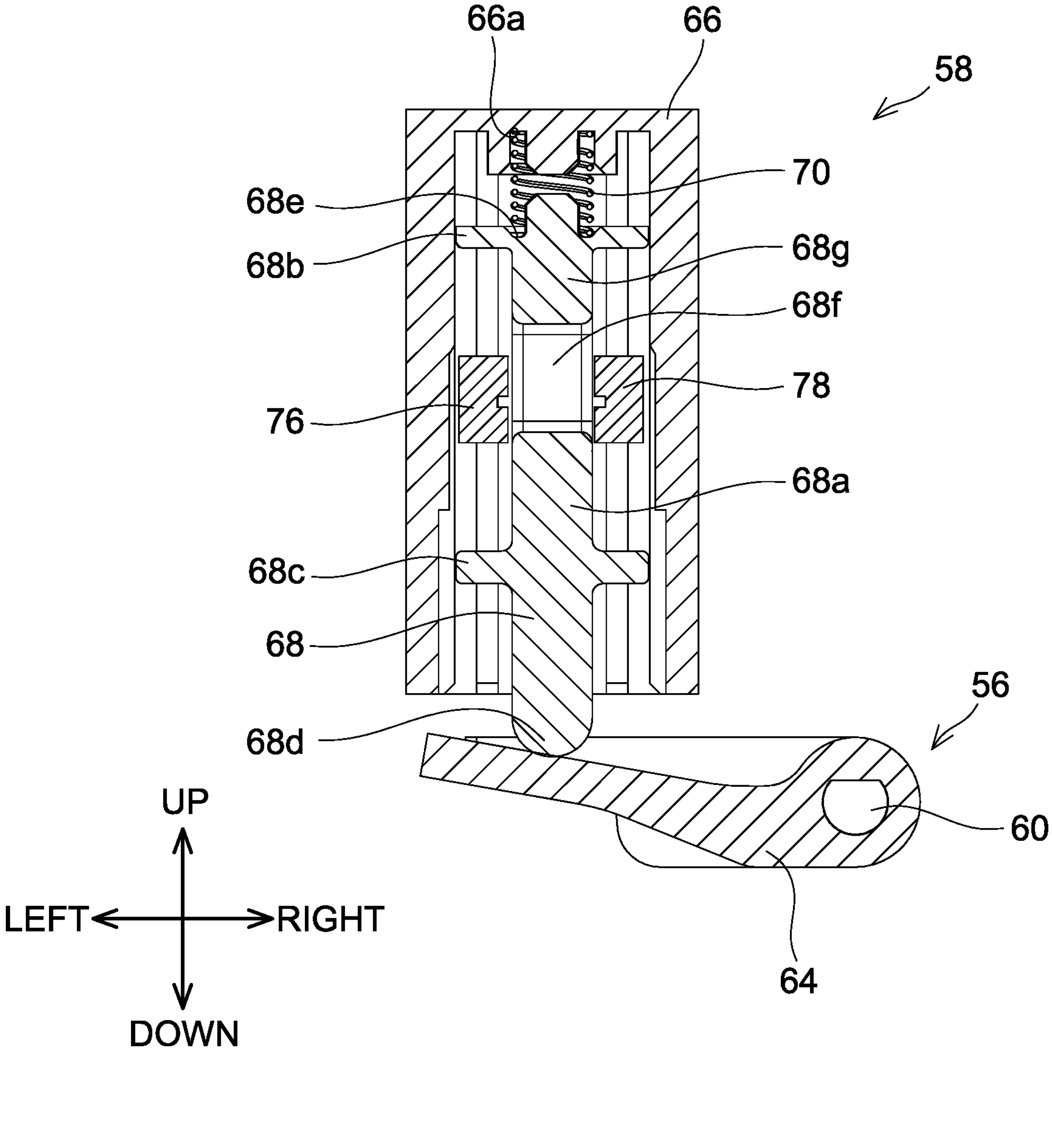
FIG. 9 is a longitudinal, cross-sectional view of the detection sensor 58, in the state in which the cover 6 is mounted, of the grinder 2 according to Working Example 1.

When the cover 6 is mounted on the grinder 2, the forward lever 62 is pushed up by the cover 6, and thereby, as shown in FIG. 8, the forward lever 62 pivots upward. Thereby, the rearward lever 64 also pivots upward, and thereby the contact part 68*d* of the sensor lever 68 is pushed up by the rearward lever 64. As shown in FIG. 9, in the state in which the sensor lever 68 is pushed up, the notched part 68*f* of the base part 68*a* is disposed between the light-emitting part 76 and the light-receiving part 78. In this state, light from the light-emitting part 76 is not blocked and therefore reaches the light-receiving part 78. The position of the sensor lever 68 in this state is also referred to as an upper-limit position.

It is noted that, when the cover 6 is removed from the grinder 2, the sensor lever 68 is pushed downward by the biasing force of the compression spring 70, and thereby, as shown in FIG. 3, the rearward lever 64 pivots downward, and the forward lever 62 also pivots downward.

With regard to the grinder 2 of the present working example, when the state results in which the grinding wheel 4 faces downward, gravity acts on the sensor lever 68 in the direction that causes the sensor lever 68 to move from the upper-limit position to the lower-limit position, and gravity acts on the forward lever 62 and the rearward lever 64 in the direction that causes the forward lever 62 and the rearward lever 64 to pivot downward. Consequently, even in the situation in which the biasing force produced by the compression spring 70 does not act on the sensor lever 68 owing to breakage, aging deterioration, or the like of the compression spring 70, when the grinding wheel 4 is set facing downward in the state in which the cover 6 has been removed from the grinder 2, the sensor lever 68 moves to the lower-limit position due to its intrinsic weight, and the forward lever 62 and the rearward lever 64 pivot downward due to their intrinsic weight.

Figure 10:
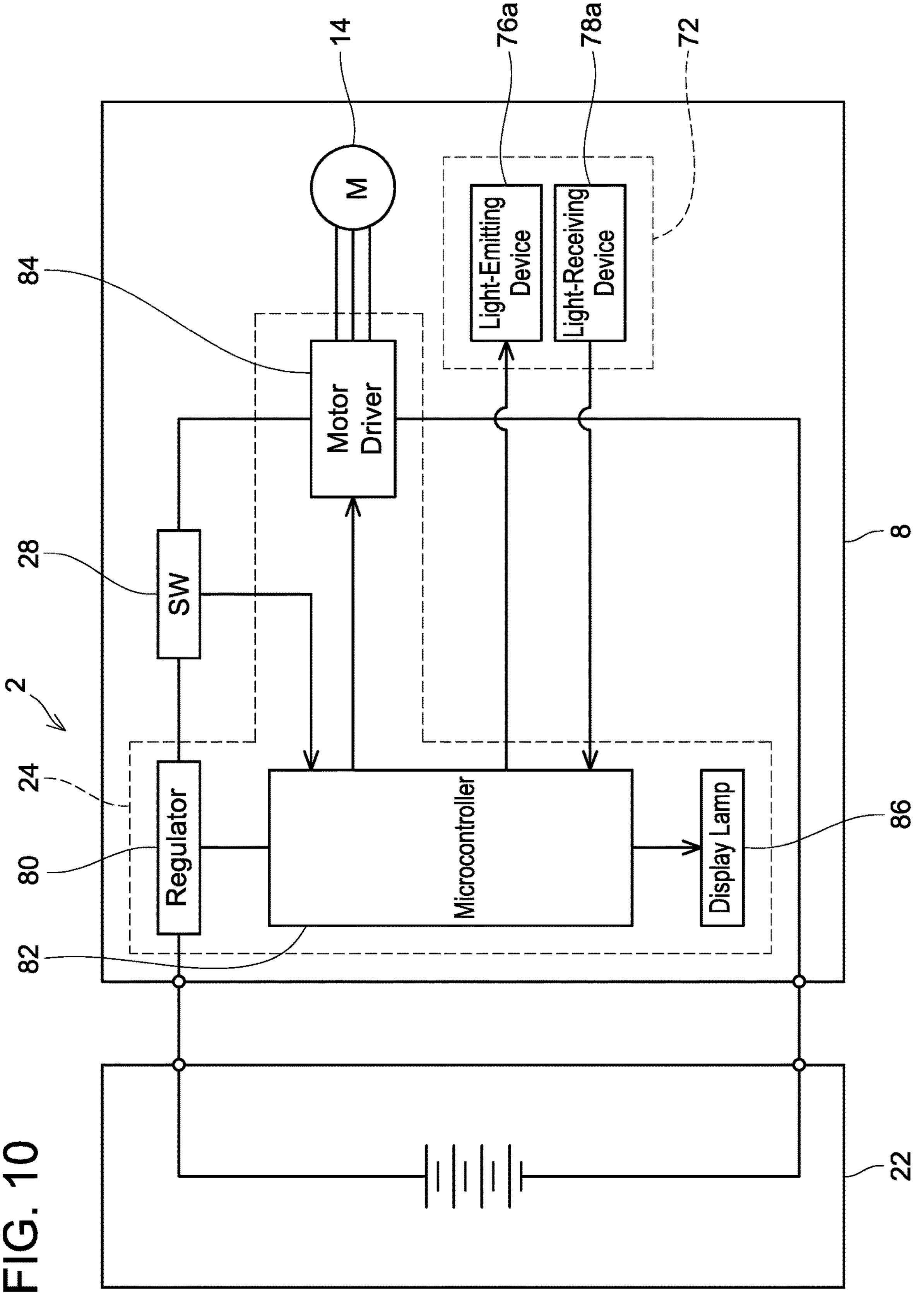
FIG. 10 is a schematic drawing of a circuit configuration of the grinder 2 according to Working Example 1.

FIG. 10 shows the circuit configuration of the grinder 2. A regulator 80, a microcontroller 82, a motor driver 84, and a display lamp 86 are installed on the control board 24. The regulator 80 regulates the electric power supplied from the battery 22 to a prescribed voltage. The motor driver 84 comprises a plurality of switching devices (not shown), which is controlled by the microcontroller 82, and controls the electric power supplied to the electric motor 14. The display lamp 86 comprises a plurality of light-emitting devices (not shown) and changes the details displayed by the display part 30. The microcontroller 82 receives a signal, indicating the ON/OFF state, from the main switch 28. In addition, the microcontroller 82 transmits an emit-light signal to the light-emitting device 76*a* of the photointerrupter 72 and receives a light-reception signal from the light-receiving device 78*a* of the photointerrupter 72.

Figure 11:
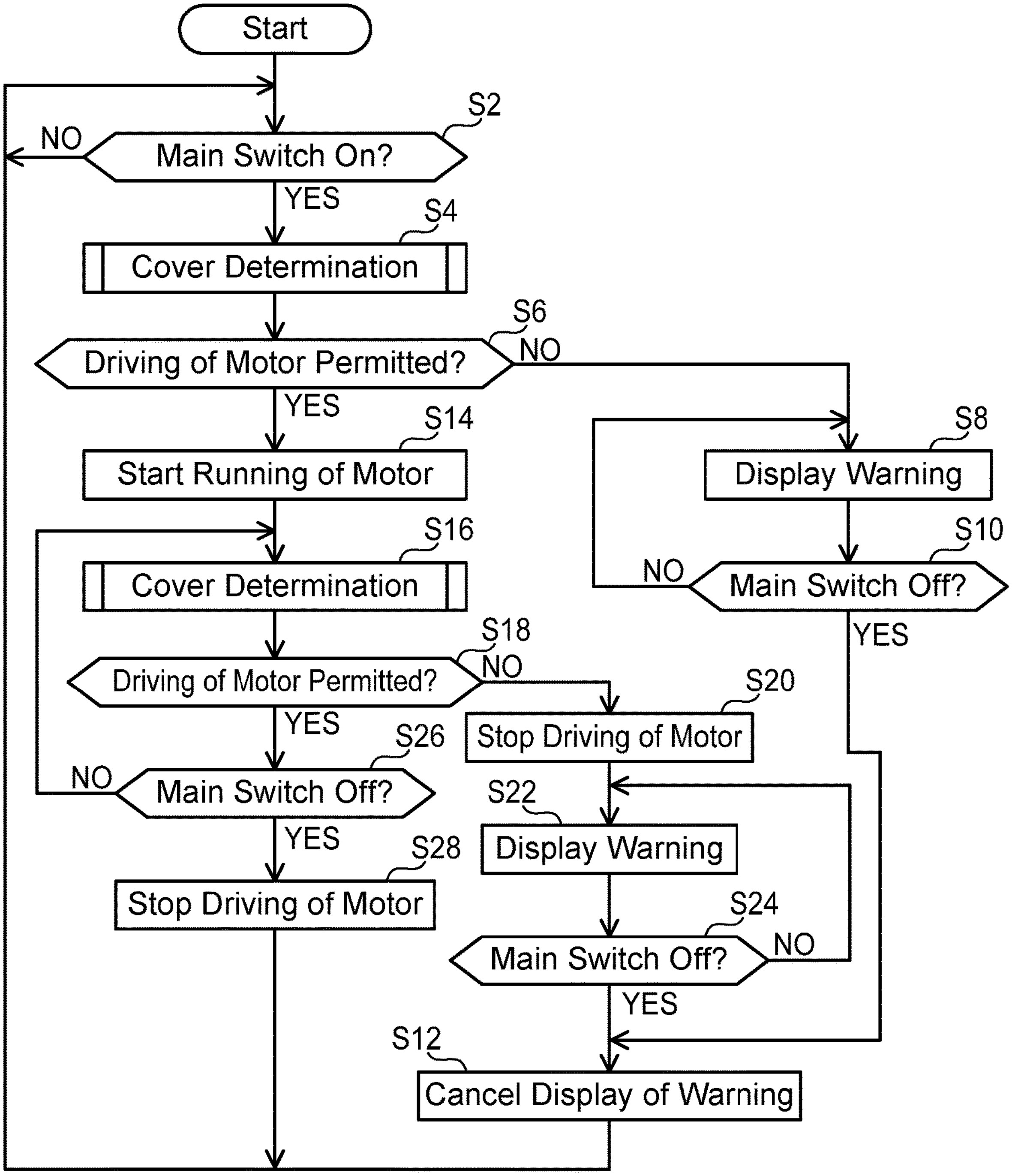
FIG. 11 is a flow chart that explains a process performed by a microcontroller 82 of the grinder 2 according to Working Example 1.

FIG. 11 is a flow chart that shows a process performed by the microcontroller 82.

In step S2, the microcontroller 82 stands by until the main switch 28 turns ON. When the main switch 28 turns ON, the process proceeds to step S4.

Figure 12:
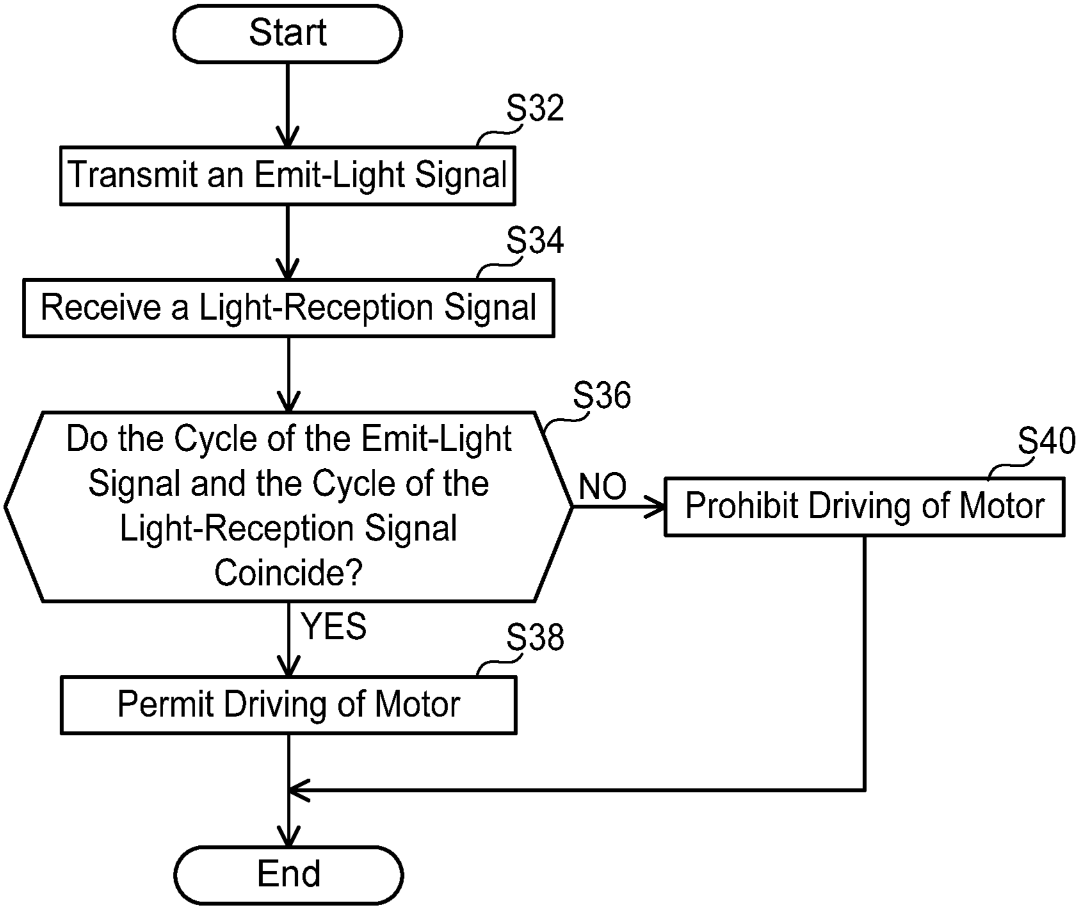
FIG. 12 is a flow chart that explains a cover-determination process performed by the microcontroller 82 of the grinder 2 according to Working Example 1.

In step S4, the microcontroller 82 performs a cover-determination process, which is shown in FIG. 12.

In step S32 of the cover-determination process shown in FIG. 12, the microcontroller 82 transmits an emit-light signal to the light-emitting device 76*a* of the photointerrupter 72. In the present working example, the microcontroller 82 transmits a signal pattern 90 (refer to FIG. 13), which has a pulse train in which an H potential and an L potential switch with a prescribed cycle, as the emit-light signal.

In step S34, the microcontroller 82 receives a light-reception signal from the light-receiving device 78*a* of the photointerrupter 72.

In step S36, the microcontroller 82 determines whether the cycle of the emit-light signal transmitted in step S32 and the cycle of the light-reception signal received in step S34 coincide.

Figure 13:
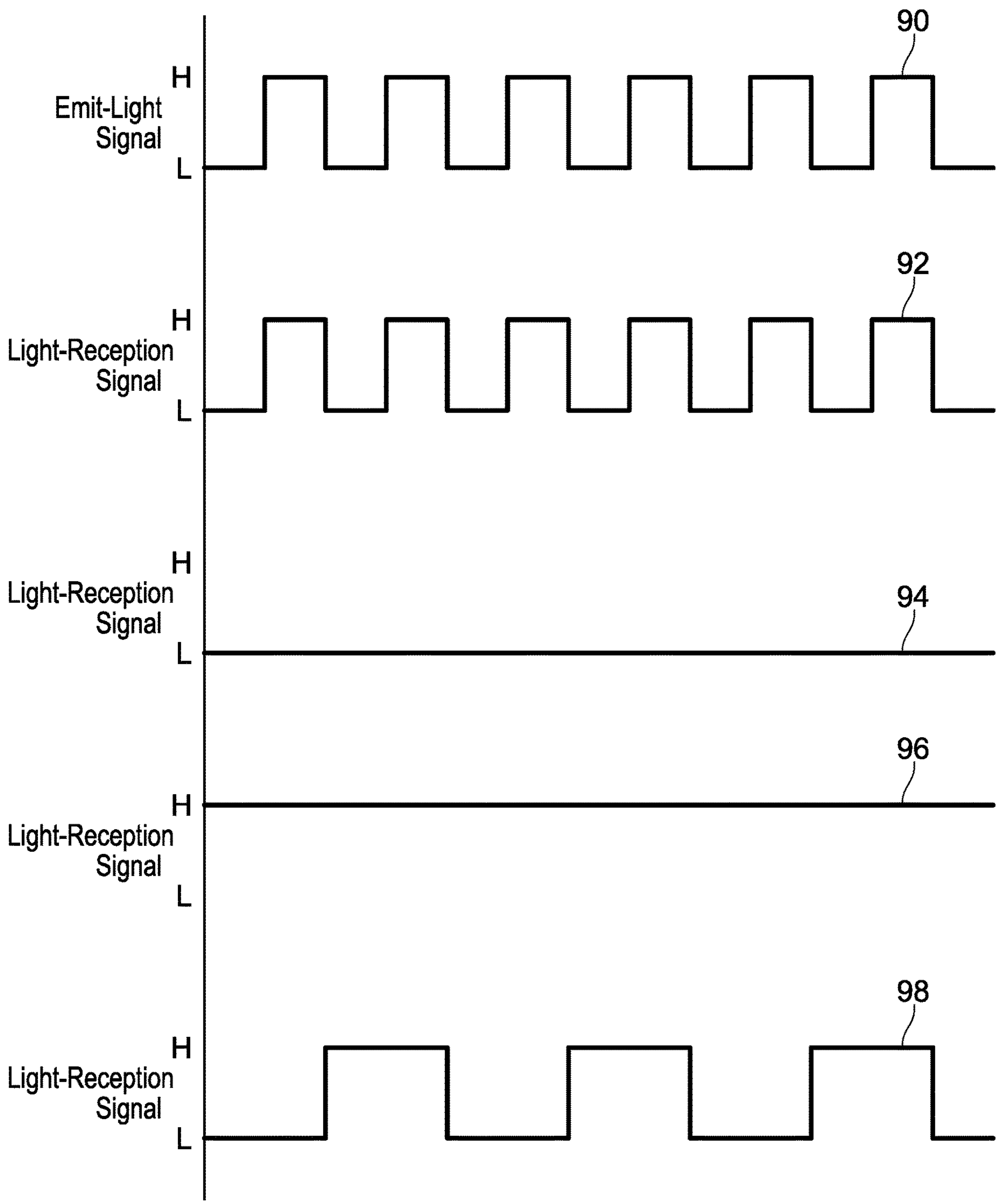
FIG. 13 is a chart that shows an example of a signal pattern 90 of a light-emitting signal and examples of signal patterns 92, 94, 96, 98 of a light-receiving signal in the grinder 2 according to Working Example 1.

As shown in FIG. 13, in the situation in which the cover 6 is mounted on the cover-mounting part 52 and accordingly the space between the light-emitting part 76 and the light-receiving part 78 is not blocked, a signal pattern 92, which has a pulse train with a cycle the same as that of the signal pattern 90 of the emit-light signal, is received as the light-reception signal. Alternatively, in the situation in which the cover 6 is not mounted on the cover-mounting part 52 and accordingly the space between the light-emitting part 76 and the light-receiving part 78 is blocked, a signal pattern 94, which is constant at the L potential, is received as the light-reception signal. It is noted that, in the situation in which a signal pattern 96, which is constant at the H potential, is received as the light-reception signal, in the situation in which a signal pattern 98, which has a pulse train with a cycle that differs from that of the emit-light signal, is received as the light-reception signal, or the like, it is conceivable that some abnormality is occurring in the photointerrupter 72.

In the situation in which the cycle of the emit-light signal and the cycle of the light-reception signal coincide (case of YES) in step S36 in FIG. 12, the microcontroller 82 determines that the cover 6 is mounted on the cover-mounting part 52, and the process proceeds to step S38. In step S38, the microcontroller 82 permits the driving of the electric motor 14. After step S38, the cover-determination process shown in FIG. 12 ends.

In the situation in which the cycle of the emit-light signal and the cycle of the light-reception signal do not coincide (case of NO) in step S36 in FIG. 12, the microcontroller 82 determines that the cover 6 is not mounted on the cover-mounting part 52 or determines that an abnormality is occurring in the photointerrupter 72, and the process proceeds to step S40. In step S40, the microcontroller 82 prohibits the driving of the electric motor 14. After step S40, the cover-determination process shown in FIG. 12 ends.

Returning to FIG. 11, in step S6, which is next after step S4, the microcontroller 82 determines whether the driving of the electric motor 14 is permitted. In the situation in which the driving of the electric motor 14 is prohibited (case of NO), the process proceeds to step S8.

In step S8, the microcontroller 82 controls the display lamp 86 so as to display a warning on the display part 30.

In step S10, the microcontroller 82 stands by until the main switch 28 turns OFF. When the main switch 28 turns OFF (when the result becomes YES), the process proceeds to step S12.

In step S12, the microcontroller 82 controls the display lamp 86 so as to cancel the display of the warning on the display part 30. After step S12, the process proceeds to step S2.

In step S6, in the situation in which the driving of the electric motor 14 is permitted (case of YES), the process proceeds to step S14. In step S14, the microcontroller 82 controls the motor driver 84 so as to start the driving of the electric motor 14. Thereby, the grinding wheel 4 rotates, and grinding of the workpiece using the grinder 2 can be performed.

In step S16, the microcontroller 82 once again performs the cover-determination process shown in FIG. 12. In the situation in which, as a result of the cover-determination process, the cover 6 is mounted, as is, on the cover-mounting part 52, the driving of the electric motor 14 is permitted (step S38 in FIG. 12); in the situation in which the cover 6 has been removed from the cover-mounting part 52, the driving of the electric motor 14 is prohibited (step S40 in FIG. 12).

In step S18, the microcontroller 82 determines whether the driving of the electric motor 14 is permitted. In the situation in which the driving of the electric motor 14 is prohibited (case of NO), the process proceeds to step S20.

In step S20, the microcontroller 82 controls the motor driver 84 so as to stop the driving of the electric motor 14.

In step S22, the microcontroller 82 controls the display lamp 86 so as to display a warning on the display part 30.

In step S24, the microcontroller 82 stands by until the main switch 28 turns OFF. When the main switch 28 turns OFF (when the result becomes YES), the process proceeds to step S12.

In step S12, the microcontroller 82 controls the display lamp 86 so as to cancel the display of the warning on the display part 30. After step S12, the process returns to step S2.

In step S18, in the situation in which the driving of the electric motor 14 is permitted (case of YES), the process proceeds to step S26. In step S26, the microcontroller 82 determines whether the main switch 28 is OFF. In the situation in which the main switch 28 is not OFF (case of NO), the process returns to step S16.

In step S26, when the main switch 28 turns OFF (when the result becomes YES), the process proceeds to step S28. In step S28, the microcontroller 82 controls the motor driver 84 so as to stop the driving of the electric motor 14. After step S28, the process returns to step S2.

By virtue of the microcontroller 82 performing the above-mentioned process, in the situation in which the slide switch 26 of the grinder 2 is set to the ON position, the electric motor 14 is driven only if the cover 6 is mounted. Thereby, in the state in which the cover 6 is not mounted, it is possible to prevent the electric motor 14 from adversely being driven.

It is noted that, in the above-mentioned process, the cover-determination process of step S16 in FIG. 11 may be configured so that it is not performed continuously but rather is performed every time a prescribed time (e.g., 1 min) elapses. Alternatively, it may be configured such that the cover-determination process of step S16 in FIG. 11 is not performed. By reducing the number of times that the cover-determination process is performed, the electric-power consumption of the battery 22 can be curtailed.

As described above, in one or more of the embodiments, the grinder 2 (example of a tool) comprises: the electric motor 14 (example of a prime mover); the bevel gear 38 (example of a power-transmission mechanism) connected to the electric motor 14; the housing 50 that houses the electric motor 14 and the bevel gear 38; the spindle 36 (example of a tool-accessory retaining part) connected to the bevel gear 38 and that holds the grinding wheel 4 (example of a tool accessory); the cover 6 (example of an accessory) mounted on the housing 50 in a detachable manner; the link member 56 that moves in response to the mounting and demounting of the cover 6; and the detection sensor 58 housed in the interior of the housing and comprising the photointerrupter 72 (example of a non-contact-type sensor device). The detection sensor 58 detects, using the photointerrupter 72, the movement of the link member 56.

According to the above-mentioned configuration, because the detection sensor 58 is housed in the interior of the housing 50, the detection sensor 58 tends not to be affected by dust. Accordingly, even in the situation in which the grinder 2 is used in an environment having a large amount of dust, it is possible to accurately detect whether the cover 6 is mounted on the housing 50. In addition, according to the above-mentioned configuration, the detection sensor 58 detects the movement of the link member 56 using photointerrupter 72, which is a non-contact-type sensor device. Thereby, even in the situation in which vibration, an impact, or the like acts on the link member 56, it is possible to prevent the impact, vibration, or the like from acting on the photointerrupter 72 via the link member 56. Erroneous detection by the photointerrupter 72 due to an impact, vibration, or the like can be prevented, and the durability of the photointerrupter 72 can be improved.

In one or more of the embodiments, the grinder 2 further comprises the control board 24 (example of the control unit), which controls the operation of the electric motor 14. The control board 24 permits, based on a detection signal from the detection sensor 58, the driving of the electric motor 14. The detection sensor 58 and the control board 24 constitute a switching unit that is configured to be switched, in response to pivotal movement of the shaft 60 of the link member 56, between a state in which the switching unit 24, 58 prohibits the electric motor (prime mover) 14 from being driven and a state in which the switching unit 24, 58 allows electric motor (prime mover) 14 to be driven.

According to the above-mentioned configuration, the driving of the electric motor 14 can be permitted only in the situation in which the cover 6 is mounted on the housing 50.

In one or more of the embodiments, the link member 56 extends from the interior to the outside of the housing 50.

According to the above-mentioned configuration, it is possible to detect whether the cover 6, which does not enter the interior of the housing 50 when mounted on the housing 50, is mounted on the housing 50.

In one or more of the embodiments, the detection sensor 58 further comprises: the sensor case 66, which houses the photointerrupter 72; and the sensor lever 68, which extends from the interior to the outside of the sensor case 66 and moves in response to the movement of the link member 56. The photointerrupter 72 detects the movement of the sensor lever 68.

According to the above-mentioned configuration, because the photointerrupter 72 of the detection sensor 58 is housed in the interior of the sensor case 66, even in the situation in which dust flows into the interior of the housing 50, the effect of the dust on the photointerrupter 72 can be curtailed.

In one or more of the embodiments, the photointerrupter 72 comprises the light-emitting device 76*a* and the light-receiving device 78*a*, which receives light from the light-emitting device 76*a*. The sensor lever 68 is movable between the upper-limit position (example of the first position), at which the space between the light-emitting device 76*a* and the light-receiving device 78*a* is not blocked, and the lower-limit position (example of the second position), at which the space between the light-emitting device 76*a* and the light-receiving device 78*a* is blocked. In the situation in which the cover 6 is not mounted on the housing 50, the sensor lever 68 is positioned at the lower-limit position. In the situation in which the cover 6 is mounted on the housing 50, the sensor lever 68 is positioned at the upper-limit position.

Compared with, for example, a sensor device that comprises a magnet and a Hall-effect device, the photointerrupter 72 that comprises the light-emitting device 76*a* and the light-receiving device 78*a* as described above tends not to be affected by the outside environment, such as an environment containing metallic powder. According to the above-mentioned configuration, because the position of the sensor lever 68 changes between the upper-limit position and the lower-limit position in response to the mounting and demounting of the cover 6, it is possible to determine whether the cover 6 is mounted on the housing 50 based on the presence or absence of the transmission of light from the light-emitting device 76*a* to the light-receiving device 78*a*.

In one or more of the embodiments, the light-emitting device 76*a* emits light based on an emit-light signal having a prescribed signal pattern 90.

Regarding the configuration in which the position of the sensor lever 68 changes between the upper-limit position and the lower-limit position in response to the mounting and demounting of the cover 6, if an attempt were to be made to determine whether the cover 6 is mounted on the housing 50 based simply on the presence or absence of the transmission of light from the light-emitting device 76*a* to the light-receiving device 78*a*, then there is a risk that, in the situation in which an ON malfunction, an OFF malfunction, or the like has occurred in the light-receiving device 78*a*, a mistaken determination of whether the cover 6 is mounted on the housing 50 will be made. According to the above-mentioned configuration, in the situation in which the sensor lever 68 is at the upper-limit position and light is being transmitted normally from the light-emitting device 76*a* to the light-receiving device 78*a*, the light-reception signal at the light-receiving device 78*a* has the same signal pattern 92 as that of the emit-light signal at the light-emitting device 76*a*. Consequently, by comparing the signal patterns 92, 94, 96, 98 of the light-reception signal at the light-receiving device 78*a* and the signal pattern 90 of the emit-light signal at the light-emitting device 76*a*, it can be determined whether the cover 6 is mounted on the housing 50, and therefore a mistaken determination due to a fault in the detection sensor 58 can be prevented.

In one or more of the embodiments, the sensor lever 68 is formed into a shape such that it is slidable along the inner-side side surface of the sensor case 66. The sensor lever 68 comprises: the base part 68*a* having a longitudinal direction in the up-down direction, a latitudinal direction in the front-rear direction, and substantially a flat-sheet shape; and the contact part 68*d*, which protrudes from the sensor case 66 and makes contact with the link member 56. The notched part 68*f*, which has a shape that does not block the space between the light-emitting device 76*a* and the light-receiving device 78*a*, and the blocking part 68*g*, which has a shape that blocks the space between the light-emitting device 76*a* and the light-receiving device 78*a*, are formed on the base part 68*a*.

According to the above-mentioned configuration, the sensor lever 68, which extends from the interior to the outside of the sensor case 66 and moves in response to the movement of the link member 56, can be implemented using a simple configuration.

In one or more of the embodiments, the housing 50 comprises the cover-mounting part 52, on which the cover 6 is mounted. The link member 56 comprises: the round-rod-shaped shaft 60; the forward lever 62 fixed to the front end of the shaft 60; and the rearward lever 64 fixed to the rear end of the shaft 60. The front end of the shaft 60 protrudes to the outside of the housing 50 via the through hole 10*a* formed in the housing 50. The forward lever 62 is disposed, outside of the housing 50, in the vicinity of the cover-mounting part 52. The rearward lever 64 is disposed, in the interior of the housing 50, downward of the detection sensor 58.

According to the above-mentioned configuration, the link member 56, which causes the sensor lever 68 to move in response to the mounting and demounting of the cover 6, which is an accessory, can be implemented using a simple configuration.

In one or more of the embodiments, with regard to the grinder 2, when the cover 6 is mounted on the cover-mounting part 52, the forward lever 62 is pressed by the cover 6 and thereby pivots upward, the rearward lever 64 also pivots upward, the contact part 68*d* is pressed by the rearward lever 64, and the sensor lever 68 moves upward, and thereby the notched part 68*f* is disposed between the light-emitting device 76*a* and the light-receiving device 78*a*, and therefore the light from the light-emitting device 76*a* reaches the light-receiving device 78*a* without being blocked.

According to the above-mentioned configuration, the detection sensor 58 can, using a simple configuration, detect the mounting of the cover 6 on and the demounting of the cover 6 from the housing 50.

In one or more of the embodiments, the link member 56 is supported by the housing 50 in a pivotable manner. The link member 56 pivots relative to the housing 50 in response to the mounting and demounting of the cover 6.

According to the above-mentioned configuration, even in the situation in which the detection sensor 58 is disposed at a location spaced apart from the mounting position of the cover 6, there is no need to make the link member 56 a large, complicated mechanism, and the link member 56, which extends from the mounting position of the cover 6 to the location of the detection sensor 58, can be disposed utilizing empty space in the interior of the housing 50.

In one or more of the embodiments, the longitudinal direction of the link member 56 is disposed in the front-rear direction (example of the first direction) that is parallel to the output shaft 16 of the electric motor 14 housed in the interior of the housing 50. The pivot shaft of the link member 56 is disposed in the front-rear direction. The sensor lever 68 is held by the sensor case 66 such that it is movable in the up-down direction (example of the second direction), which is orthogonal to the front-rear direction. The detection sensor 58 further comprises the compression spring 70 (example of an elastic member), which is housed in the interior of the sensor case 66 and biases the sensor lever 68 from the upper-limit position toward the lower-limit position.

According to the above-mentioned configuration, the configuration of the link member 56, the detection sensor 58, etc. can be simplified.

In one or more of the embodiments, the grinder 2 further comprises the control board 24 (example of a control unit), which controls the electric power supplied to the electric motor 14. The detection sensor 58 is disposed between the electric motor 14 and the control board 24.

According to the above-mentioned configuration, the detection sensor 58 can be disposed utilizing empty space in the interior of the housing 50 between the electric motor 14 and the control board 24.

In one or more of the embodiments, the grinder 2 further comprises the battery 22, which is mounted on the housing 50 in a detachable manner and supplies electric power to the electric motor 14. The detection sensor 58 is disposed between the electric motor 14 and the battery 22.

According to the above-mentioned configuration, the detection sensor 58 can be disposed utilizing empty space in the interior of the housing 50 between the electric motor 14 and the battery 22.

In one or more of the embodiments, the cover 6, which is an accessory, at least partially covers the grinding wheel 4.

According to the above-mentioned configuration, whether or not the cover 6, which at least partially covers the grinding wheel 4, is mounted on the housing 50 can be detected by the detection sensor 58.

In one or more of the embodiments, the grinder 2 (example of a tool) comprises: the electric motor 14 (example of a prime mover); the bevel gear 38 (example of a power-transmission mechanism) connected to the electric motor 14; the housing 50 that houses the electric motor 14 and the bevel gear 38; the spindle 36 (example of a tool-accessory retaining part) connected to the bevel gear 38 and that holds the grinding wheel 4 (example of a tool accessory); the cover 6 (example of an accessory) mounted on the housing 50 in a detachable manner; the link member 56 that moves in response to the mounting and demounting of the cover 6; and the detection sensor 58, which is housed in the interior of the housing 50. The link member 56 pivots relative to the housing 50 in response to the mounting and demounting of the cover 6. The detection sensor 58 detects the pivoting movement of the link member 56.

According to the above-mentioned configuration, because the detection sensor 58 is housed in the interior of the housing 50, the detection sensor 58 tends not to be affected by dust. Accordingly, even in the situation in which the grinder 2 is used in an environment containing a large amount of dust, it is possible to accurately detect whether the cover 6 is mounted on the housing 50. In addition, according to the above-mentioned configuration, even in the situation in which the detection sensor 58 is disposed at a location spaced apart from the mounting position of the cover 6, there is no need to make the link member 56 a large, complicated mechanism, and the link member 56, which extends from the mounting position of the cover 6 to the location of the detection sensor 58, can be disposed utilizing empty space in the interior of the housing 50.

In one or more of the embodiments, the grinder 2 further comprises the control board 24 (example of a control unit), which controls the operation of the electric motor 14. The control board 24 permits, based on a detection signal from the detection sensor 58, the driving of the electric motor 14.

According to the above-mentioned configuration, the driving of the electric motor 14 can be permitted only in the situation in which the cover 6 is mounted on the housing 50.

In one or more of the embodiments, the link member 56 is supported by the housing 50 in a pivotable manner. The link member 56 extends from the interior to the outside of the housing 50.

According to the above-mentioned configuration, the link member 56, which extends from the mounting position of the cover 6 outside of the housing 50 to the location of the detection sensor 58 in the interior of the housing 50, can be disposed utilizing empty space in the interior of the housing 50.

The above-mentioned working example explained the configuration in which: when the sensor lever 68 is at the upper-limit position, the notched part **68*f* is disposed between the light-emitting part 76 and the light-receiving part 78, and therefore the space between the light-emitting device 76*a* and the light-receiving device 78*a* is not blocked; and when the sensor lever 68 is at the lower-limit position, the blocking part 68*g* is disposed between the light-emitting part 76 and the light-receiving part 78, and therefore the space between the light-emitting device 76*a* and the light-receiving device 78*a* is blocked. Alternatively, for example, the sensor lever 68 may be shaped such that the position of the notched part 68*f* and the position of the blocking part 68*g* are switched. In this situation, when the sensor lever 68 is at the upper-limit position, the blocking part 68*g* is disposed between the light-emitting part 76 and the light-receiving part 78, and thereby the space between the light-emitting device 76*a* and the light-receiving device 78*a* is blocked; and when the sensor lever 68 is at the lower-limit position, the notched part 68*f* is disposed between the light-emitting part 76 and the light-receiving part 78, and thereby the space between the light-emitting device 76*a* and the light-receiving device 78*a*** is not blocked.

Working Example 2

Figure 14:
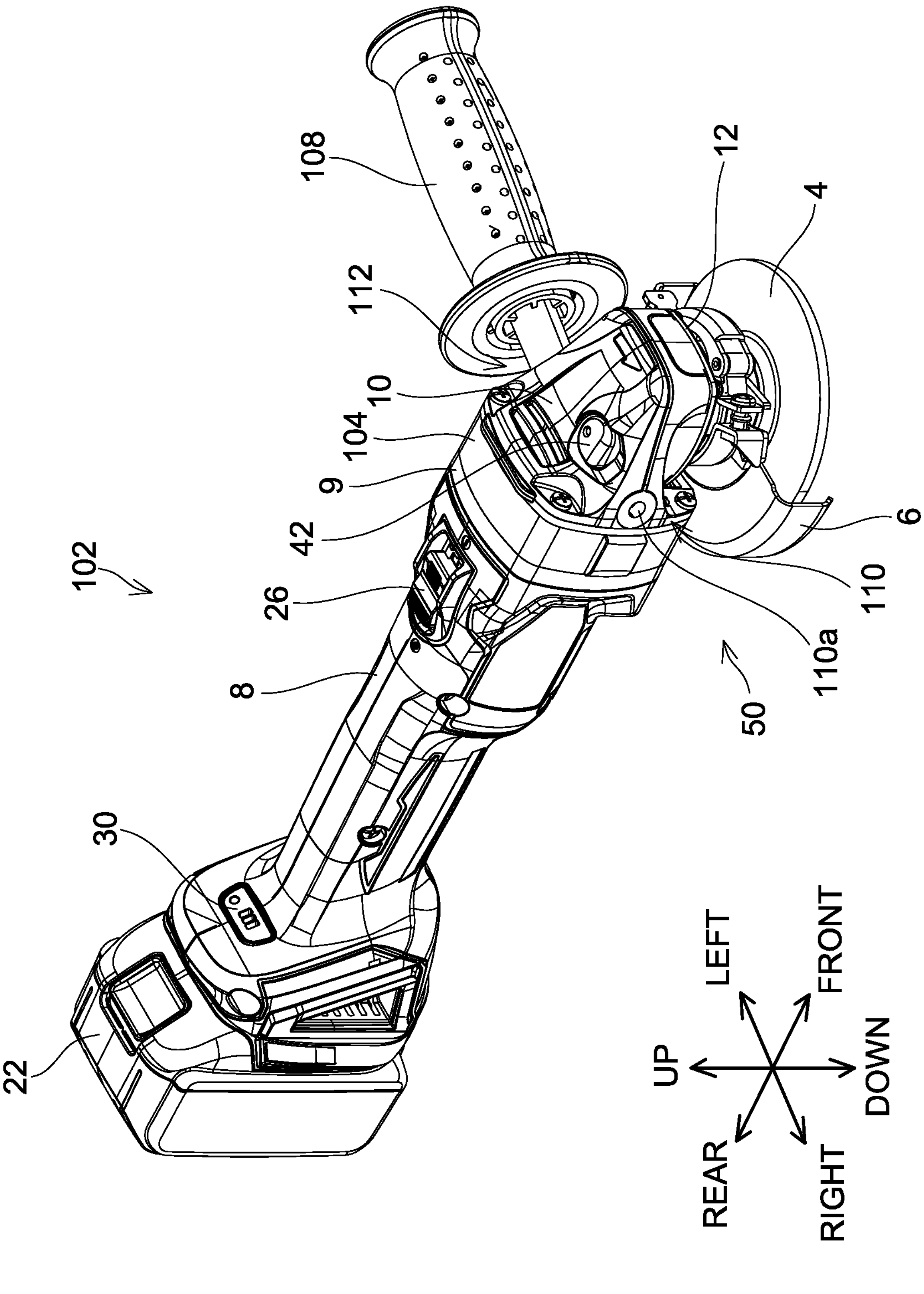
FIG. 14 is an oblique view of a grinder 102 according to Working Example 2.

As shown in FIG. 14, a grinder 102 of the present working example has a configuration that is substantially the same as that of the grinder 2 of Working Example 1. Those points regarding the grinder 102 of the present working example that differ from those of the grinder 2 of Working Example 1 will be explained below.

With regard to the grinder 102 of the present working example, the housing 50 comprises a spacer housing 104 in addition to the main-body housing 8, the gear-housing cover 9, the gear housing 10, and the bearing box 12. The spacer housing 104 is provided between the gear-housing cover 9 and the gear housing 10.

Figure 15:
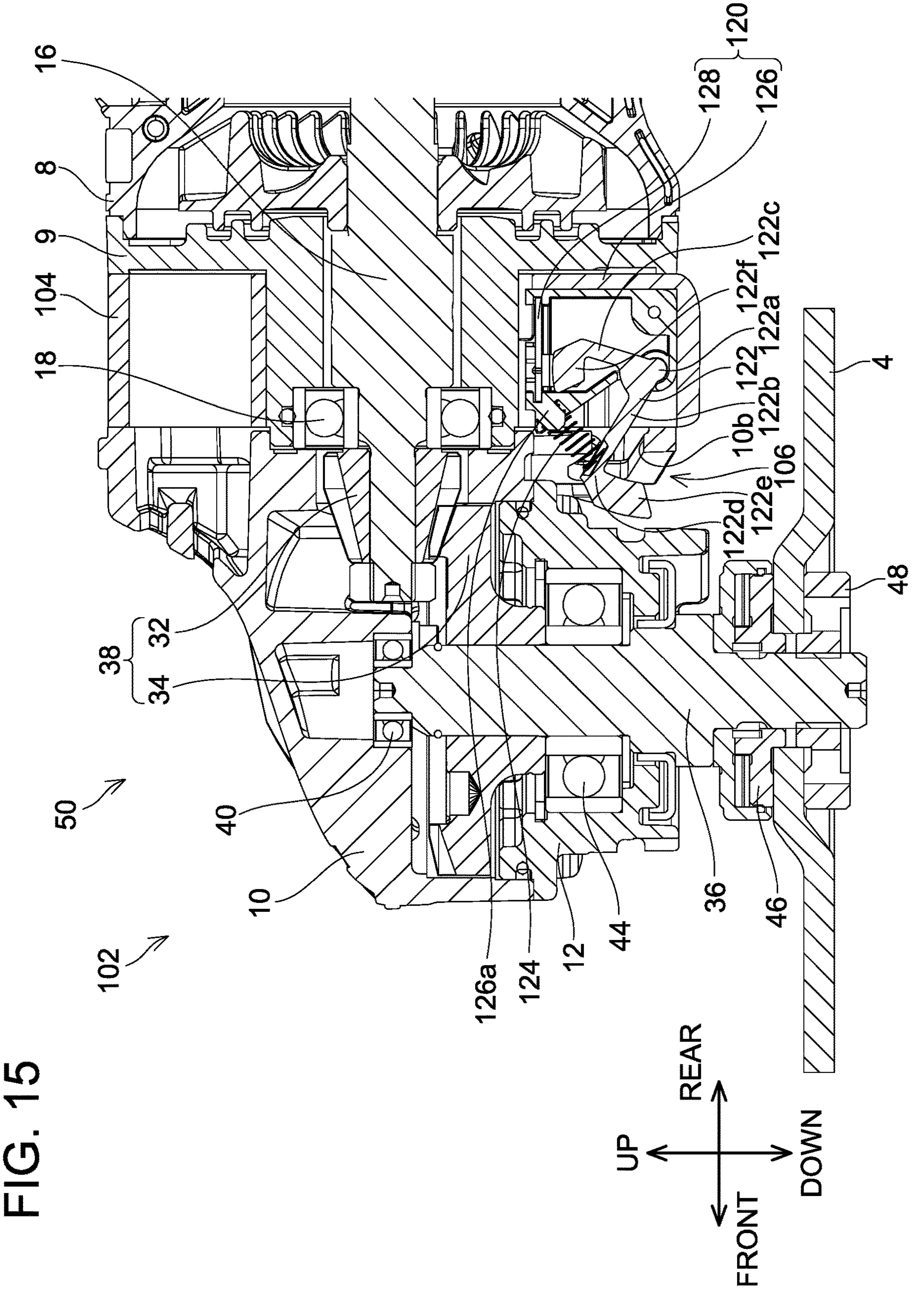
FIG. 15 is a longitudinal, cross-sectional view of the vicinity of a cover-mounting part 52, in the state in which the cover 6 is not mounted, of the grinder 102 according to Working Example 2.

The grinder 102 of the present working example does not comprise the cover-detection mechanism 54. Instead, as shown in FIG. 15, the grinder 102 comprises a cover-detection unit 106. The cover-detection unit 106 is provided on the spacer housing 104. The cover-detection unit 106 detects whether the cover 6 is mounted on the cover-mounting part 52.

As shown in FIG. 14, the grinder 102 comprises, as accessories, a side handle 108 in addition to the cover 6. The side handle 108 is mounted on the gear housing 10 in a detachable manner. When using the grinder 102, the user grips the main-body housing 8 with one hand and grips the side handle 108 with the other hand, and thereby the user can stably hold the grinder 102.

Figure 16:
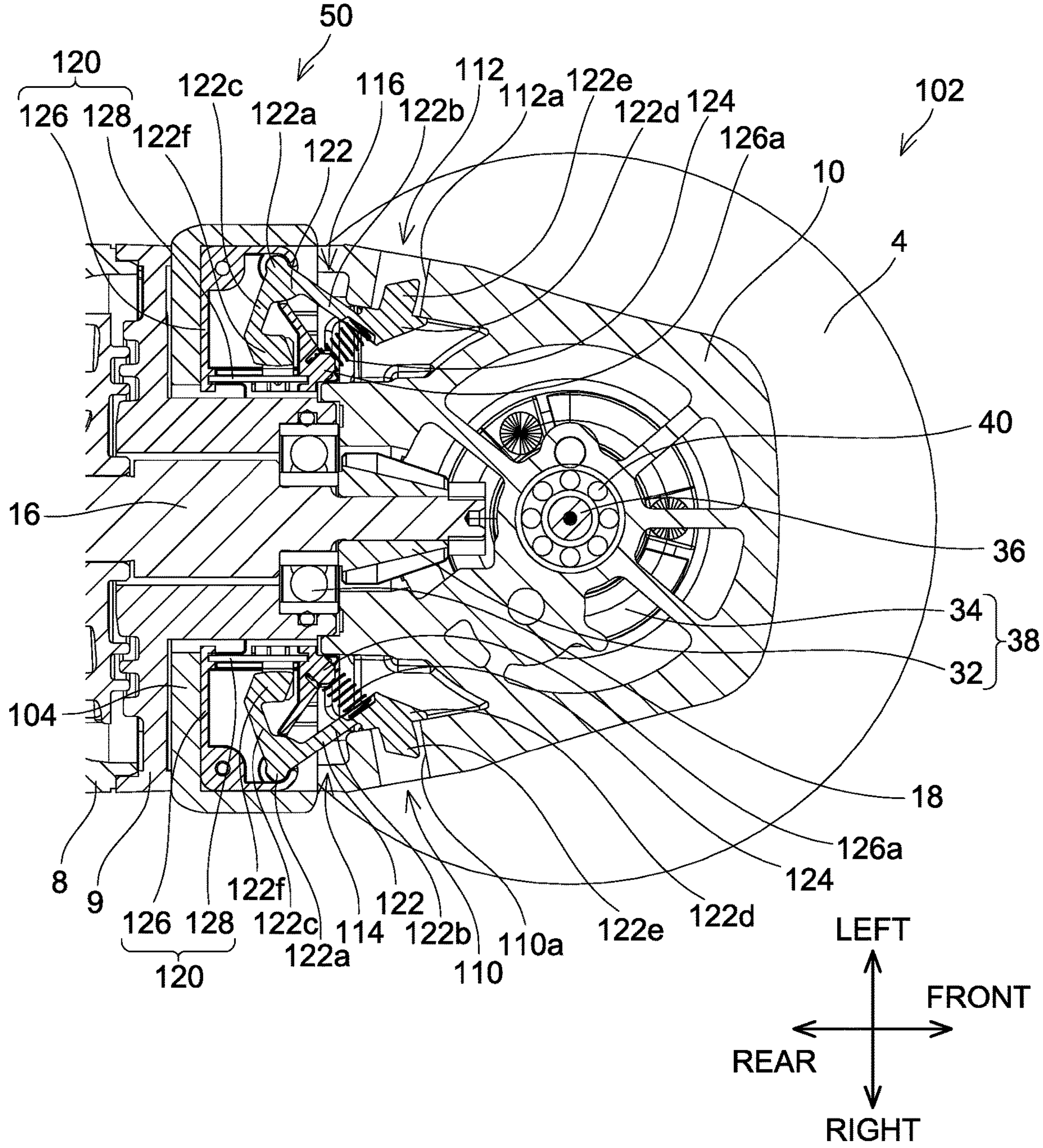
FIG. 16 is a transverse, cross-sectional view of the vicinity of handle-mounting parts 110, 112, in the state in which a side handle 108 is not mounted, of the grinder 102 according to Working Example 2.

As shown in FIG. 16, handle-mounting parts 110, 112 are provided on the gear housing 10. The handle-mounting part 110 is disposed on a right surface of the gear housing 10, and the handle-mounting part 112 is disposed on a left surface of the gear housing 10. The handle-mounting parts 110, 112 have handle-mounting holes **110*a*, 112*a*, respectively; the handle-mounting holes 110*a*, 112*a* pass through the gear housing 10 from the exterior to the interior; and female threads, corresponding to a male thread of a screw part 108*a* (refer to FIG. 21) of the side handle 108, are formed on inner-circumferential surfaces of the handle-mounting holes 110*a*, 112*a*. The side handle 108 can be mounted on the handle-mounting part 110 by screwing the screw part 108***a* into the handle-mounting hole 110*a* and can also be mounted on the handle-mounting part 112 by screwing the screw part 108*a* into the handle-mounting hole 112*a*.

Handle-detection units 114, 116 are provided on the spacer housing 104. The handle-detection unit 114 corresponds to and is disposed on the handle-mounting part 110. The handle-detection unit 114 detects whether the side handle 108 is mounted on the handle-mounting part 110. The handle-detection unit 116 corresponds to and is disposed on the handle-mounting part 112. The handle-detection unit 116 detects whether the side handle 108 is mounted on the handle-mounting part 112.

The cover-detection unit 106 shown in FIG. 15 has the same configuration as those of both the handle-detection units 114, 116 shown in FIG. 16. Hereinbelow, the cover-detection unit 106 and the handle-detection units 114, 116 are also collectively referred to simply as a detection unit 118. The configuration of the detection unit 118 is explained below, with reference to FIG. 17 to FIG. 19.

Figure 17:
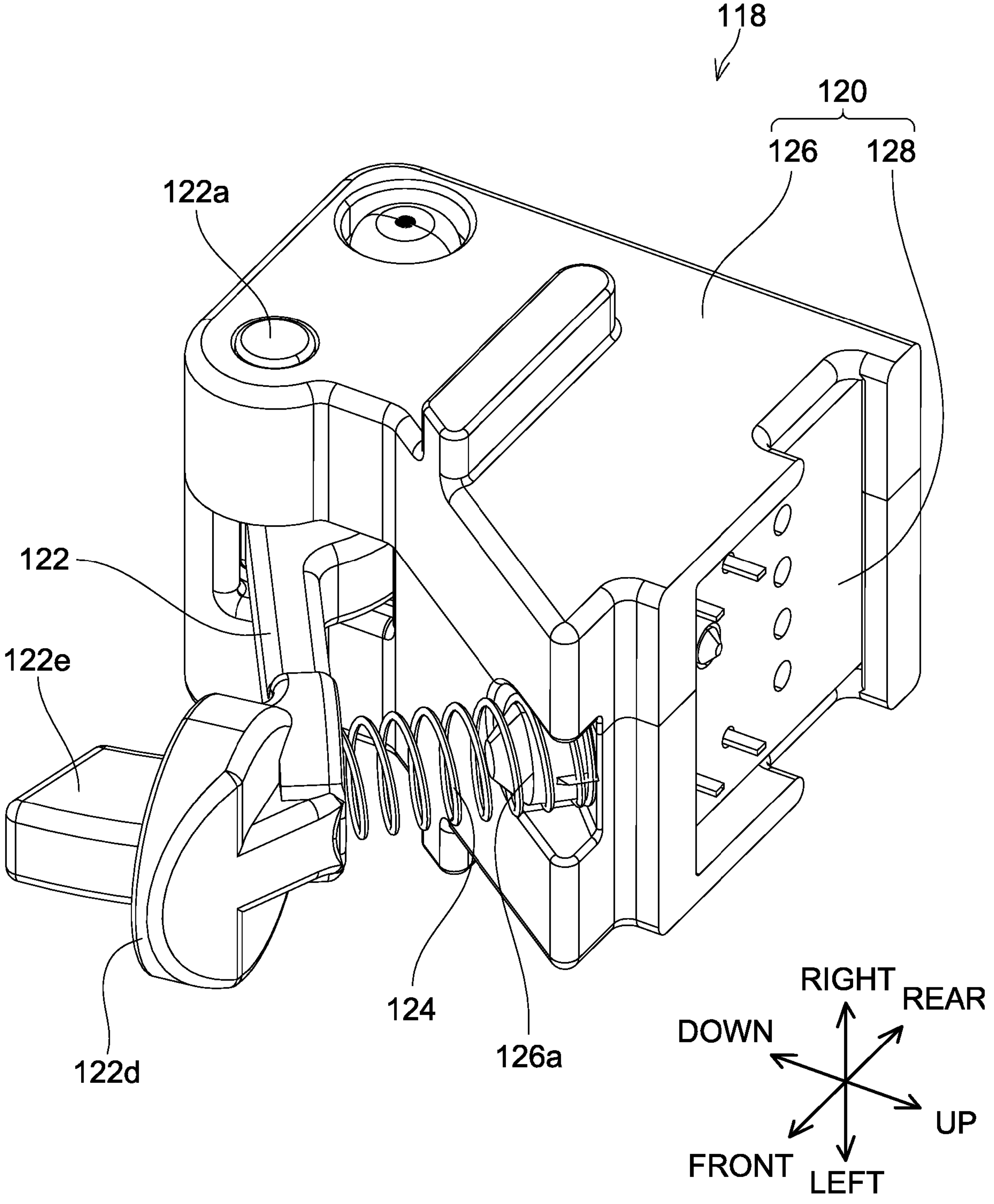
FIG. 17 is an oblique view of a detection unit 118 of the grinder 102 according to Working Example 2.
Figure 18:
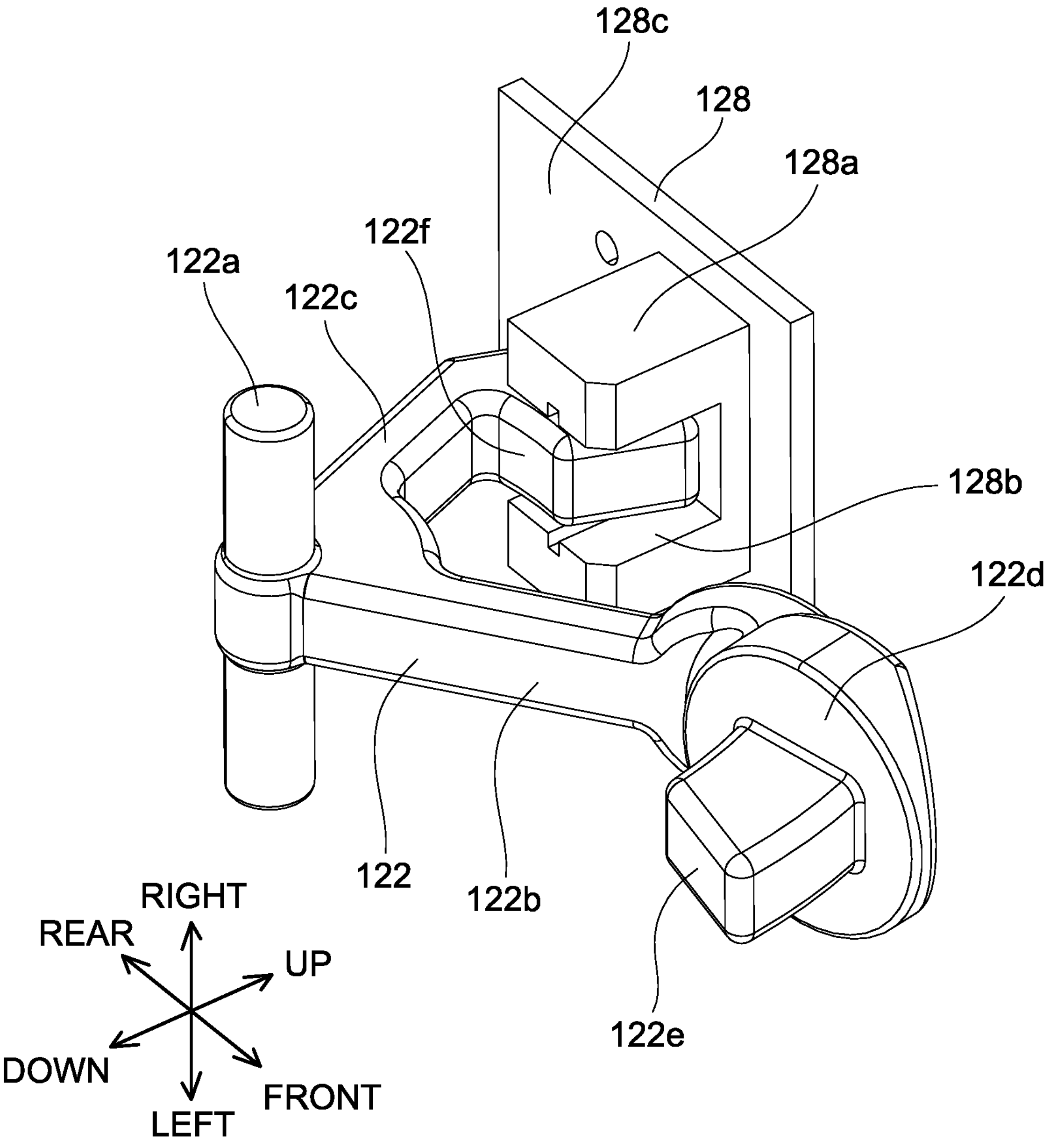
FIG. 18 is an oblique view of a link member 122 and a photointerrupter 128, in the state in which the link member 122 is at a blocking position, of the grinder 102 according to Working Example 2.
Figure 19:
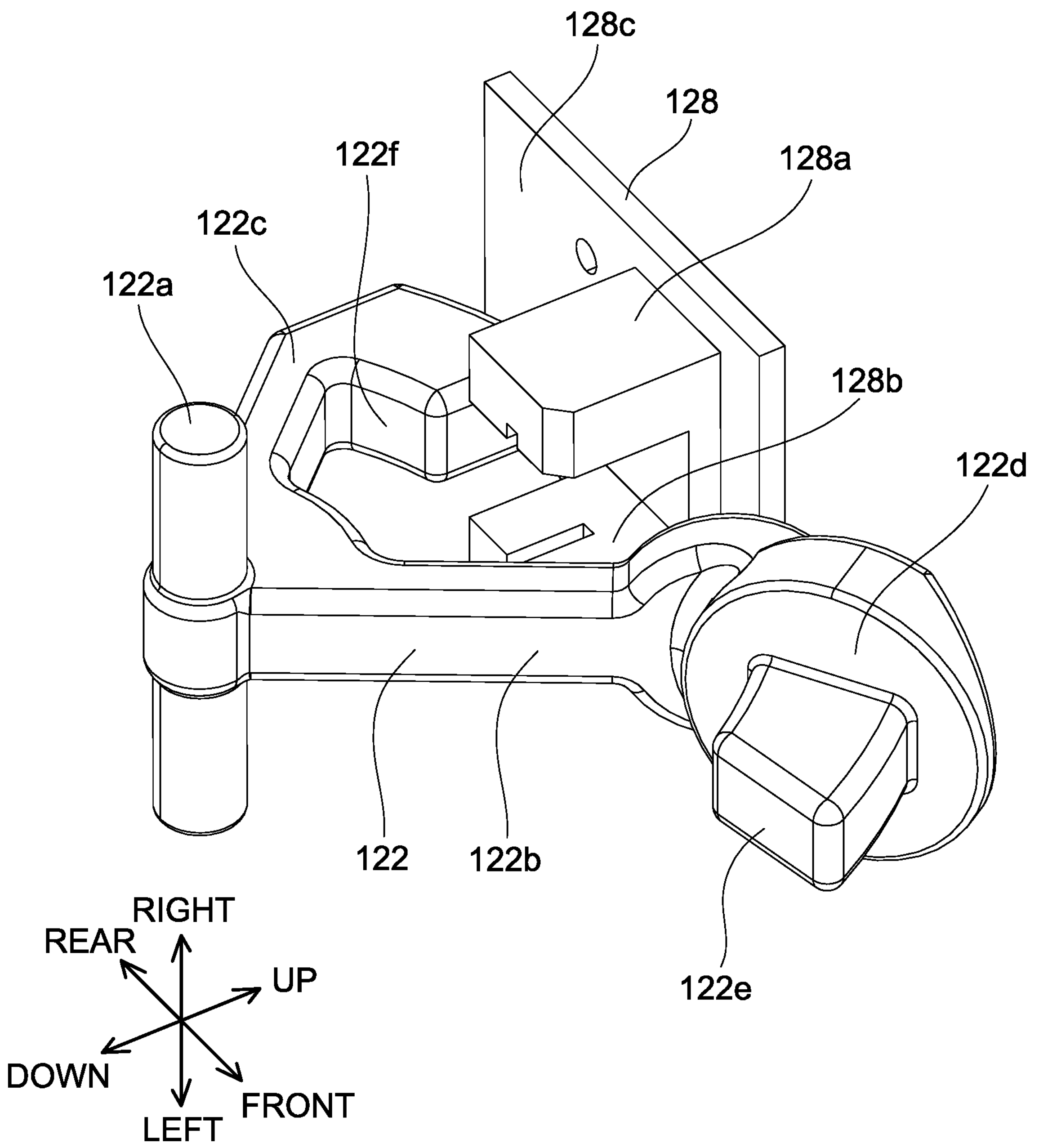
FIG. 19 is an oblique view of the link member 122 and the photointerrupter 128, in the state in which the link member 122 is at a non-blocking position, of the grinder 102 according to Working Example 2.

As shown in FIG. 17, the detection unit 118 comprises a detection sensor 120, a link member 122, and a compression spring 124. The detection sensor 120 comprises a sensor case 126 and a photointerrupter 128. As shown in FIG. 18 and FIG. 19, the photointerrupter 128 comprises: a sensor board 128*c*; and a light-emitting device 128*a* and a light-receiving device 128*b*, which are installed on the sensor board 128*c*. The light-emitting device 128*a* and the light-receiving device 128*b* are disposed opposing one another. The sensor board 128*c* is held by the sensor case 126 such that the light-emitting device 128*a* and the light-receiving device 128*b* are housed inside the sensor case 126. The sensor board 128*c* is connected to the control board 24 via wiring, which is not shown. Using the same process as in Working Example 1, the microcontroller 82 of the control board 24 transmits emit-light signals to the light-emitting device 128*a* of the photointerrupter 128 and receives light-reception signals from the light-receiving device 128*b* of the photointerrupter 128.

The link member 122 comprises a swing shaft 122*a*, a contact arm 122*b*, and a detection arm 122*c*. The swing shaft 122*a* is held by the sensor case 126 in a swingable manner. The link member 122 is held by the sensor case 126 such that the contact arm 122*b* protrudes to the outside of the sensor case 126 and such that the detection arm 122*c* is housed in the interior of the sensor case 126. The contact arm 122*b* comprises a flange 122*d* and a protruding part 122*e*, which protrudes from the flange 122*d*. The detection arm 122*c* comprises a blocking part 122*f*, which has a shape that blocks the space between the light-emitting device 128*a* and the light-receiving device 128*b*. The link member 122 is swingable between a blocking position (refer to FIG. 18), in which the blocking part 122*f* is disposed such that it blocks the space between the light-emitting device 128*a* and the light-receiving device 128*b*, and a non-blocking position (refer to FIG. 19), in which the blocking part 122*f* is disposed such that it does not block the space between the light-emitting device 128*a* and the light-receiving device 128*b*. It is noted that a sealing member (not shown) may be provided in the opening of the sensor case 126 through which the link member 122 passes. By providing the sealing member in the opening of the sensor case 126, it is possible to curtail the penetration of dust from the outside to the inside of the sensor case 126, and thereby to curtail the effects of dust on the operation of the photointerrupter 128.

As shown in FIG. 17, the compression spring 124 is mounted on a projection 126*a*, which is formed on an outer portion of the sensor case 126. The compression spring 124 biases the link member 122 toward the sensor case 126 such that the link member 122 swings from the non-blocking position (refer to FIG. 19) toward the blocking position (refer to FIG. 18).

As shown in FIG. 15, the cover-detection unit 106 is disposed in a lower portion of the spacer housing 104 in the vicinity of the center portion of the spacer housing 104 in the left-right direction. The cover-detection unit 106 is held by the spacer housing 104 such that the swing shaft 122*a* of the link member 122 is disposed in the left-right direction and such that the protruding part 122*e* faces downward. With regard to the cover-detection unit 106, the detection sensor 120 is housed in the interior of the spacer housing 104, the contact arm 122*b* of the link member 122 protrudes to the outside of the housing 50 via a through hole 10*b* in the gear housing 10, and the flange 122*d* and the protruding part 122*e* are disposed on an outer portion of the housing 50. It is noted that a forward portion of the cover-detection unit 106 is notched so that the flange 122*d* of the link member 122 does not interfere with the gear housing 10.

As shown in FIG. 15, in the state in which the cover 6 is not mounted on the cover-mounting part 52, the link member 122 is at the blocking position, and the blocking part 122*f* is disposed such that it blocks the space between the light-emitting device 128*a* and the light-receiving device 128*b*. In this situation, the control board 24 determines that the cover 6 is not mounted on the cover-mounting part 52.

Figure 20:
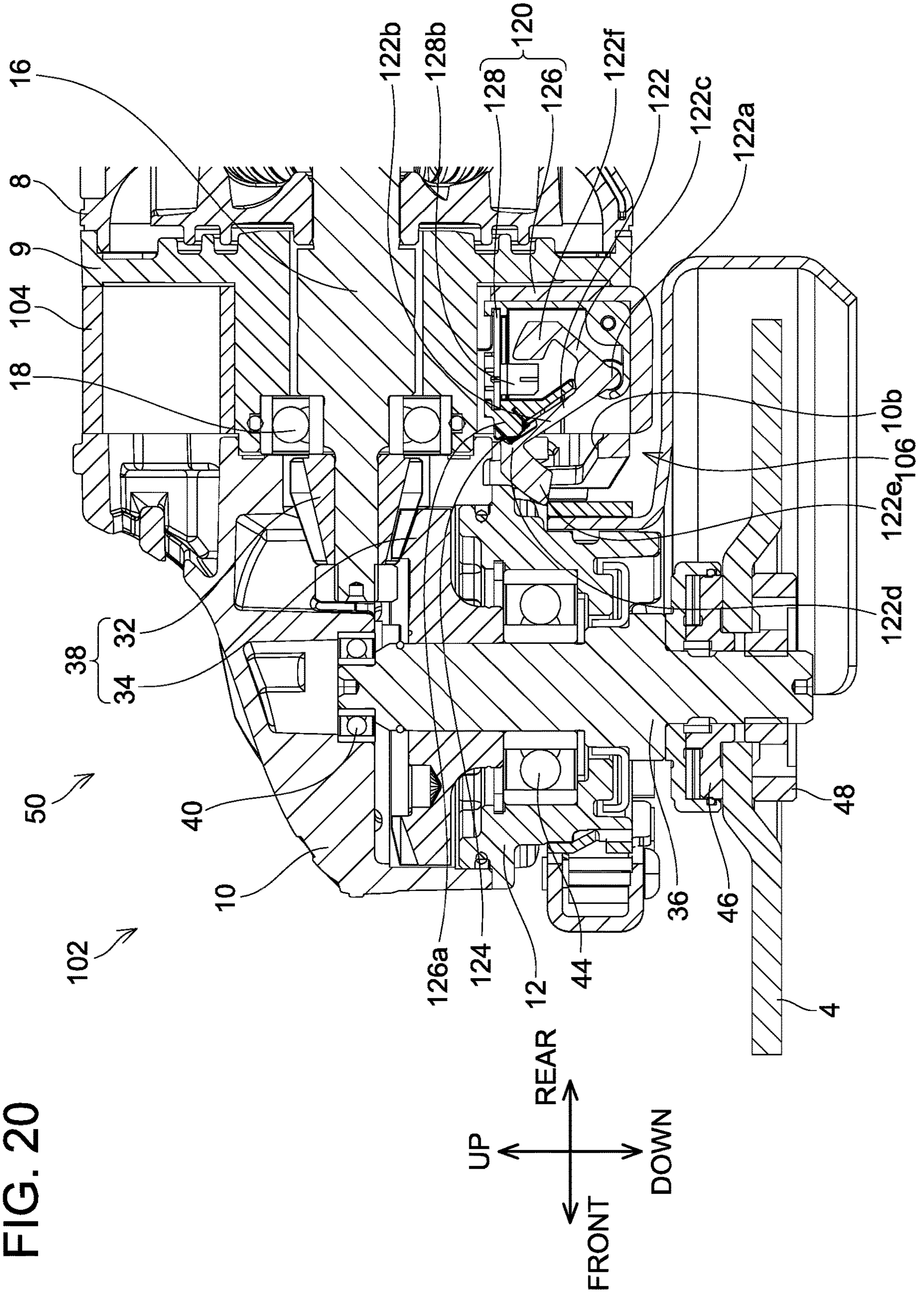
FIG. 20 is a longitudinal, cross-sectional view of the vicinity of the cover-mounting part 52, in the state in which the cover 6 is mounted, of the grinder 102 according to Working Example 2.

As shown in FIG. 20, when the cover 6 is mounted on the cover-mounting part 52, the protruding part 122*e* of the link member 122 makes contact with and is pressed against the upper end of the cover 6. Thereby, the link member 122 swings from the blocking position to the non-blocking position, and thereby the blocking part 122*f* is disposed such that it does not block the space between the light-emitting device 128*a* and the light-receiving device 128*b*. In this situation, the control board 24 determines that the cover 6 is mounted on the cover-mounting part 52. It is noted that, from this state, when the cover 6 is removed from the cover-mounting part 52, the link member 122 swings, owing to the biasing force of the compression spring 124, from the non-blocking position to the blocking position and thereby returns to the state shown in FIG. 15.

As shown in FIG. 16, the handle-detection unit 114 is disposed on a right portion of the spacer housing 104. The handle-detection unit 114 is held by the spacer housing 104 such that the swing shaft 122*a* of the link member 122 is disposed in the up-down direction and the protruding part 122*e* faces rightward. With regard to the handle-detection unit 114, the detection sensor 120 is housed in the interior of the spacer housing 104, and the flange 122*d* and the protruding part 122*e* of the link member 122 are disposed in the interior of the gear housing 10. With regard to the handle-detection unit 114, the protruding part 122*e* enters the handle-mounting hole 110*a*, and the flange 122*d* makes contact with the inner surface of the gear housing 10.

The handle-detection unit 116 is disposed on a left portion of the spacer housing 104. The handle-detection unit 116 is held by the spacer housing 104 such that the swing shaft 122*a* of the link member 122 is disposed in the up-down direction and the protruding part 122*e* faces leftward. With regard to the handle-detection unit 116, the detection sensor 120 is housed in the interior of the spacer housing 104, and the flange 122*d* and the protruding part 122*e* of the link member 122 are disposed in the interior of the gear housing 10. With regard to the handle-detection unit 116, the protruding part 122*e* enters the handle-mounting hole 112*a*, and the flange 122*d* makes contact with the inner surface of the gear housing 10.

As shown in FIG. 16, in the state in which the side handle 108 is not mounted on either of the handle-mounting parts 110, 112, in each of the handle-detection units 114, 116, the link member 122 is at the blocking position, and the blocking part 122*f* is disposed such that it blocks the space between the light-emitting device 128*a* and the light-receiving device 128*b*. In this situation, the control board 24 determines that the side handle 108 is not mounted on either of the handle-mounting parts 110, 112.

Figure 21:
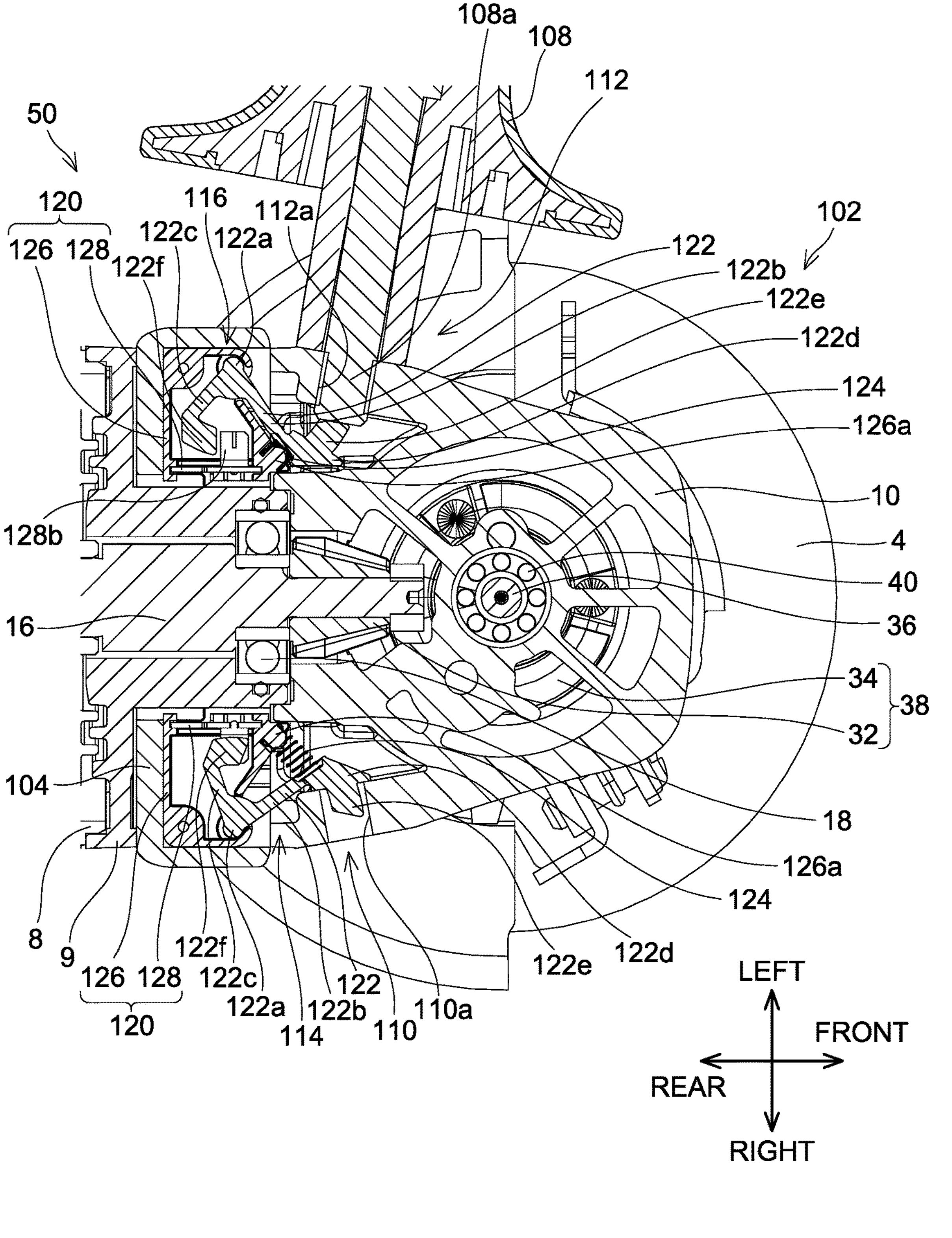
FIG. 21 is a transverse, cross-sectional view of the vicinity of the handle-mounting parts 110, 112, in the state in which the side handle 108 is mounted, of the grinder 102 according to Working Example 2.

As shown in FIG. 21, when the side handle 108 is mounted on one of the handle-mounting parts 110, 112, e.g., the handle-mounting part 112, the protruding part 122*e* of the link member 122 of the handle-detection unit 116 makes contact with and is pressed against the screw part 108*a* of the side handle 108. Thereby, with regard to the handle-detection unit 116, the link member 122 swings from the blocking position to the non-blocking position, and thereby the blocking part 122*f* is disposed such that it does not block the space between the light-emitting device 128*a* and the light-receiving device 128*b*. In this situation, the control board 24 determines that the side handle 108 is mounted on the handle-mounting part 112. It is noted that, from this state, when the side handle 108 is removed from the handle-mounting part 112, the link member 122 of the handle-detection unit 116 swings, owing to the biasing force of the compression spring 124, from the non-blocking position to the blocking position and returns to the state shown in FIG. 16.

As described above, in one or more of the embodiments, the grinder 102 (example of a tool) comprises: the electric motor 14 (example of a prime mover); the bevel gear 38 (example of a power-transmission mechanism) connected to the electric motor 14; the housing 50 that houses the electric motor 14 and the bevel gear 38; the spindle 36 (example of a tool-accessory retaining part) connected to the bevel gear 38 and that holds the grinding wheel 4 (example of a tool accessory); the cover 6, the side handle 108, or the like (example of an accessory) mounted on the housing 50 in a detachable manner; the link member 122 that moves in response to the mounting and demounting of the cover 6, the side handle 108, or the like; and the detection sensor 120 housed in the interior of the housing 50 and comprising the photointerrupter 128 (example of a non-contact-type sensor device). The detection sensor 120 detects, using the photointerrupter 128, the movement of the link member 122.

According to the above-mentioned configuration, because the detection sensor 120 is housed in the interior of the housing 50, the detection sensor 120 tends not to be affected by dust. Accordingly, even in the situation in which the grinder 102 is used in an environment having a large amount of dust, it is possible to accurately detect whether the cover 6, the side handle 108, or the like is mounted on the housing 50. In addition, according to the above-mentioned configuration, the detection sensor 120 detects the movement of the link member 122 using the photointerrupter 128, which is a non-contact-type sensor device. Thereby, even in the situation in which vibration, an impact, or the like acts on the link member 122, it is possible to prevent the impact, vibration, or the like from acting on the photointerrupter 128 via the link member 122. Erroneous detection by the photointerrupter 128 due to an impact, vibration, or the like can be prevented, and the durability of the photointerrupter 128 can be improved.

In one or more of the embodiments, the grinder 102 further comprises the control board 24 (example of a control unit), which controls the operation of the electric motor 14. The control board 24 permits, based on a detection signal from the detection sensor 120, the driving of the electric motor 14.

According to the above-mentioned configuration, the driving of the electric motor 14 can be permitted only in the situation in which the cover 6, the side handle 108, or the like is mounted on the housing 50.

In one or more of the embodiments, the link member 122 of the cover-detection unit 106 extends from the interior to the outside of the housing 50.

According to the above-mentioned configuration, it is possible to detect whether the cover 6, which does not enter the interior of the housing 50 when mounted on the housing 50, is mounted on the housing 50.

In one or more of the embodiments, the detection sensor 120 further comprises the sensor case 126, which houses the photointerrupter 128. The link member 122 extends from the interior to the outside of the sensor case 126. The photointerrupter 128 detects the movement of the link member 122.

According to the above-mentioned configuration, because the photointerrupter 128 directly detects the movement of the link member 122 without going through a member, such as the sensor lever 68 of the first embodiment, the configuration of the detection sensor 120 can be simplified, and the number of parts can be reduced.

In one or more of the embodiments, the photointerrupter 128 comprises the light-emitting device 128*a* and the light-receiving device 128*b*, which receives light from the light-emitting device 128*a*. The link member 122 is movable between the non-blocking position (example of the first position), at which the space between the light-emitting device 128*a* and the light-receiving device 128*b* is not blocked, and the blocking position (example of the second position), at which the space between the light-emitting device 128*a* and the light-receiving device 128*b* is blocked. In the situation in which the cover 6, the side handle 108, or the like is not mounted on the housing 50, the link member 122 is positioned at the blocking position. In the situation in which the cover 6, the side handle 108, or the like is mounted on the housing 50, the link member 122 is positioned at the non-blocking position.

According to the above-mentioned configuration, compared with the situation in which, for example, a sensor device comprising a magnet and a Hall-effect device is used, it is possible to make it such that the sensor device tends not to be affected by the outside environment, such as an environment containing metallic powder.

In one or more of the embodiments, the light-emitting device 128*a* emits light based on an emit-light signal having a prescribed signal pattern.

According to the above-mentioned configuration, a mistaken determination due to a fault of the detection sensor 120 can be prevented.

In one or more of the embodiments, the link member 122 comprises: the swing shaft 122*a*, which is held by the sensor case 126 in a swingable manner; the contact arm 122*b*, which protrudes to the outside of the sensor case 126; and the detection arm 122*c*, which is housed in the interior of the sensor case 126. The contact arm 122*b* comprises the flange 122*d* and the protruding part 122*e*, which protrudes from the flange 122*d*. The detection arm 122*c* comprises the blocking part 122*f*, which has a shape that blocks the space between the light-emitting device 128*a* and the light-receiving device 128*b*.

According to the above-mentioned configuration, the link member 122, which moves in response to the mounting and demounting of the cover 6, the side handle 108, or the like, and the detection sensor 120, which detects the movement of the link member 122, can be implemented using a simple configuration.

In one or more of the embodiments, the housing 50 comprises the cover-mounting part 52, on which the cover 6 is mounted. With regard to the cover-detection unit 106, the sensor case 126 is disposed, in the interior of the housing 50, in the vicinity of the center portion of the housing 50 in the left-right direction. The sensor case 126 is held by the housing 50 such that the swing shaft 122*a* is disposed in the left-right direction and the protruding part 122*e* faces downward. The contact arm 122*b* protrudes to the outside of the housing 50 via the through hole 10*b* in the housing 50. The flange 122*d* and the protruding part 122*e* are disposed, on outer portions of the housing 50, in the vicinity of the cover-mounting part 52.

According to the above-mentioned configuration, the detection sensor 120 can, using a simple configuration, detect the mounting of the cover 6 on and the demounting of the cover 6 from the housing 50.

In one or more of the embodiments, the housing 50 has the handle-mounting holes 110*a*, 112*a* in which the side handle 108 is mounted. With regard to the handle-detection units 114, 116, the sensor case 126 is disposed in the interior of the housing 50. The sensor case 126 is held by the housing 50 such that the swing shaft 122*a* is disposed in the up-down direction and the protruding part 122*e* opposes the handle-mounting holes 110*a*, 112*a*. In the situation in which the side handle 108 is not mounted in the handle-mounting holes 110*a*, 112*a*, the flange 122*d* makes contact with the inner surface of the housing 50, and the protruding part 122*e* enters the handle-mounting holes 110*a*, 112*a*.

According to the above-mentioned configuration, the detection sensor 120 can, using a simple configuration, detect the mounting of the side handle 108 on and the demounting of the side handle 108 from the housing 50.

In one or more of the embodiments, the link member 122 is supported by the sensor case 126 in a pivotable manner. The link member 122 pivots relative to the sensor case 126 in response to the mounting and demounting of the cover 6, the side handle 108, or the like.

Regarding the configuration in which the link member 122 and the detection sensor 120 are separately mounted on the housing 50, if an error were to occur at either of the mounting positions, then there is a risk that the relative positional relationship between the link member 122 and the photointerrupter 128 will differ from supposition, and thereby the detection sensor 120 will adversely make a mistaken determination. According to the above-mentioned configuration, because the link member 122 is mounted on the sensor case 126, the relative positional relationship between the link member 122 and the photointerrupter 128 can be accurately managed.

In one or more of the embodiments, with regard to the cover-detection unit 106, the pivot shaft of the link member 122 and the photointerrupter 128 are disposed such that they are lined up in the up-down direction (example of a direction that is substantially orthogonal to the output shaft 16 of the electric motor 14 housed in the interior of the housing 50). With regard to the handle-detection units 114, 116, the pivot shaft of the link member 122 and the photointerrupter 128 are disposed such that they are lined up in the left-right direction (example of a direction that is substantially orthogonal to the output shaft 16 of the electric motor 14).

According to the above-mentioned configuration, the link member 122 and the detection sensor 120 can be disposed utilizing empty space in the interior of the housing 50 around the output shaft 16 of the electric motor 14.

In one or more of the embodiments, with regard to the cover-detection unit 106, the pivot shaft of the link member 122 is disposed in the left-right direction (example of the second direction) orthogonal to the front-rear direction (example of the first direction), which is parallel to the output shaft 16 of the electric motor 14. The cover-detection unit 106 of the grinder 102 comprises the compression spring 124 (example of an elastic member), which biases the link member 122 from the non-blocking position toward the blocking position. With regard to the handle-detection units 114, 116, the pivot shaft of the link member 122 is disposed such that it is lined up in the up-down direction (example of the second direction) orthogonal to the front-rear direction (example of the first direction), which is parallel to the output shaft 16 of the electric motor 14. The handle-detection units 114, 116 of the grinder 102 each comprise the compression spring 124 (example of an elastic member), which biases the link member 122 from the non-blocking position toward the blocking position.

According to the above-mentioned configuration, the configuration of the link member 122, the detection sensor 120, etc. can be further simplified.

In one or more of the embodiments, the detection sensor 120 is disposed between the spindle 36 and the electric motor 14 in the front-rear direction (example of the direction in which the output shaft 16 of the electric motor 14 extends).

According to the above-mentioned configuration, the detection sensor 120 can be disposed utilizing empty space in the interior of the housing 50 between the spindle 36 and the electric motor 14.

In one or more of the embodiments, the grinder 102 comprises: a plurality of the detection sensors 120 corresponding to the cover-detection unit 106 and the handle-detection units 114, 116; and a plurality of the link members 122 corresponding to the plurality of the detection sensors 120.

According to the above-mentioned configuration, whether the cover 6, the side handle 108, or the like is mounted on the cover-mounting part 52, the handle-mounting parts 110, 112, or the like, respectively, can be detected.

In one or more of the embodiments, the cover 6, which is an accessory, at least partially covers the grinding wheel 4, and the side handle 108, which is an accessory, is a handle that is grippable by the user.

According to the above-mentioned configuration, whether the cover 6 that at least partially covers the grinding wheel 4, the side handle 108, which is grippable by the user, or the like, is mounted on the housing 50 can be detected by the detection sensor 120.

In one or more of the embodiments, the grinder 102 (example of a tool) comprises: the electric motor 14 (example of a prime mover); the bevel gear 38 (example of a power-transmission mechanism) connected to the electric motor 14; the housing 50 that houses the electric motor 14 and the bevel gear 38; the spindle 36 (example of a tool-accessory retaining part) connected to the bevel gear 38 and that holds the grinding wheel 4 (example of a tool accessory); the cover 6, the side handle 108, or the like (example of an accessory) mounted on the housing 50 in a detachable manner; the link member 122 that moves in response to the mounting and demounting of the cover 6, the side handle 108, or the like; and the detection sensor 120, which is housed in the interior of the housing 50. The link member 122 pivots relative to the housing 50 in response to the mounting and demounting of the cover 6, the side handle 108, or the like. The detection sensor 120 detects the pivoting movement of the link member 122.

According to the above-mentioned configuration, because the detection sensor 120 is housed in the interior of the housing 50, the detection sensor 120 tends not to be affected by dust. Accordingly, even in the situation in which the grinder 102 is used in an environment containing a large amount of dust, it is possible to accurately detect whether the cover 6, the side handle 108, or the like is mounted on the housing 50. In addition, according to the above-mentioned configuration, even in the situation in which the detection sensor 120 is disposed at a location spaced apart from the mounting position of the cover 6, the side handle 108, or the like, there is no need to make the link member 122 a large, complicated mechanism, and the link member 122, which extends from the mounting position of the cover 6, the side handle 108, or the like to the location of the detection sensor 120, can be disposed utilizing empty space in the interior of the housing 50.

In one or more of the embodiments, the grinder 102 further comprises the control board 24 (example of a control unit), which controls the operation of the electric motor 14. The control board 24 permits, based on a detection signal from the detection sensor 120, the driving of the electric motor 14.

According to the above-mentioned configuration, the driving of the electric motor 14 can be permitted only in the situation in which the cover 6, the side handle 108, or the like is mounted on the housing 50.

Modified Examples

In the above-mentioned working examples, configurations were explained in which the photointerrupters 72, 128, which comprise the light-emitting devices 76*a*, 128*a* and the light-receiving devices 78*a*, 128*b*, respectively, are used as the non-contact-type sensor devices. Alternatively, for example, Hall-effect devices (not shown), which detect magnetism from the magnets (not shown) fixed to the sensor lever 68, the link member 122, or the like, may be used as the non-contact-type sensor devices.

In the above-mentioned working examples, configurations were explained in which the electric motor 14 is an inner-rotor-type brushless DC motor, but the electric motor 14 may be, for example, an outer-rotor-type brushless DC motor. Alternatively, the electric motor 14 may be a brushed DC motor. Alternatively, the electric motor 14 may be some other type of motor such as an AC motor.

In the above-mentioned working examples, configurations were explained in which the grinder 2 operates by being supplied with DC power from the battery 22, but the grinder 2 may be configured to operate by being supplied with AC electrical power via a power-supply cord (not shown).

In the above-mentioned working examples, the situation was explained, as an example, in which the tool is the grinder 2, the prime mover is the electric motor 14, the tool accessory is the grinding wheel 4, the tool-accessory retaining part is the spindle 36, and the accessory is the cover 6, the side handle 108, and the like; however, the tool may be a tool of another type, the prime mover may be a prime mover of another type, the tool accessory may be a tool accessory of another type, the tool-accessory retaining part may be a tool-accessory retaining part of another type, and the accessory may be an accessory of another type.

The invention claimed is:

1. A tool comprising:

a prime mover;

a power-transmission mechanism operably connected to the prime mover;

a housing that houses the prime mover and the power-transmission mechanism;

a tool-accessory retaining part operably connected to the power-transmission mechanism, the tool-accessory retaining part being configured to hold a tool accessory;

an accessory mounted on the housing in a detachable manner;

a link member configured to move in response to mounting and demounting of the accessory, the link member extending from an interior of the housing to an exterior of the housing; and a detection sensor housed in an interior of the housing and comprising:

a sensor device comprising a light-emitting device and a light-receiving device configured to detect light from the light-emitting device;

a sensor case, which houses the sensor device; and a sensor lever, which extends from an interior of the sensor case to an exterior of the sensor case and moves along an interior surface of the sensor case in response to movement of the link member;

wherein;

the sensor lever is movable between a first position, at which a space between the light-emitting device and the light-receiving device is not blocked, and a second position, at which the space between the light-emitting device and the light-receiving device is blocked;

the sensor lever comprises:

a base part having a longitudinal direction in an up-down direction, a latitudinal direction in a front-rear direction perpendicular to the up-down direction, and the base part having substantially a flat-sheet shape; and a contact part, which protrudes from the sensor case and makes contact with the link member; and the base part includes a notched part, which has a first shape configured to not block the space between the light-emitting device and the light-receiving device, and a blocking part, which has a second shape that configured to block the space between the light-emitting device and the light-receiving device;

in a state in which the accessory is not mounted on the housing, the sensor lever is positioned at one of the first position and the second position;

in a state in which the accessory is mounted on the housing, the sensor lever is positioned at the other of the first position and the second position; and the detection sensor is configured to detect, using the sensor device, movement of the sensor lever and thus the link member.

2. The tool according to claim 1, further comprising:

a control unit configured to control operation of the prime mover;

wherein the control unit is configured to permit, in response to receiving a detection signal from the detection sensor, driving of the prime mover.

3. The tool according to claim 1, wherein:

the accessory comprises a cover that at least partially covers the tool accessory;

the housing comprises a cover-mounting part, on which the cover is mounted;
the link member comprises:
a round, rod-shaped shaft;
a forward lever fixed to a front end of the shaft; and
a rearward lever fixed to a rear end of the shaft;
the front end of the shaft protrudes to the exterior of the housing via a through hole formed in the housing;
the forward lever is disposed, outside of the housing, proximal to the cover-mounting part;
the rearward lever is disposed, in the interior of the housing, downward of the detection sensor; and
the link member is configured such that, in response to the cover being mounted on the cover-mounting part, the forward lever is pressed by the cover and thereby pivots upward, the rearward lever also pivots upward, the contact part is pressed by the rearward lever, and the sensor lever moves upward, such that the notched part is disposed between the light-emitting device and the light-receiving device and light from the light-emitting device reaches the light-receiving device without being blocked.

4. The tool according to claim 1, wherein:
the link member is supported by the housing in a pivotable manner;
the link member is configured to pivot relative to the housing in response to the mounting and demounting of the accessory;
the prime mover is an electric motor;
a longitudinal direction of the link member extends in a first direction that is at least substantially parallel to an output shaft of the electric motor housed in the interior of the housing;
a pivot shaft of the link member is disposed in the first direction;
the sensor lever is held by the sensor case such that the sensor lever is movable in a second direction, which is at least substantially orthogonal to the first direction; and
the detection sensor further comprises an elastic member, which is housed in the interior of the sensor case and biases the sensor lever from the first position toward the second position.

5. The tool according to claim 4, further comprising:
a control unit configured to control an amount of electric power supplied to the electric motor;
wherein the detection sensor is disposed between the electric motor and the control unit.

6. The tool according to claim 4, further comprising:
a battery mounted on the housing in a detachable manner and supplying the electric power to the electric motor;
wherein the detection sensor is disposed between the electric motor and the battery.

7. The tool according to claim 1, wherein the accessory comprises a cover that at least partially covers the tool accessory.

8. A tool comprising:
a prime mover;
a power-transmission mechanism operably connected to the prime mover;
a housing that houses the prime mover and the power-transmission mechanism;
a tool-accessory retaining part operably connected to the power-transmission mechanism, the tool-accessory retaining part being configured to hold a tool accessory;
an accessory mounted on the housing in a detachable manner;
a link member configured to move in response to mounting and demounting of the accessory, the link member extending from an interior of the housing to an exterior of the housing; and
a detection sensor housed in an interior of the housing and comprising:
a sensor device comprising a light-emitting device and a light-receiving device configured to detect light from the light-emitting device; and
a sensor case, which houses the sensor device;
wherein:
the link member is movable between a first position, at which a space between the light-emitting device and the light-receiving device is not blocked, and a second position, at which the space between the light-emitting device and the light-receiving device is blocked;
in a state in which the accessory is not mounted on the housing, the link member is positioned at one of the first position and the second position;
in a state in which the accessory is mounted on the housing, the link member is positioned at the other of the first position and the second position;
the detection sensor is configured to detect, using the sensor device, movement of the link member;
the link member comprises:
a swing shaft held by the sensor case in a swingable manner;
a contact arm, which protrudes to the exterior of the sensor case; and
a detection arm housed in the interior of the sensor case;
the contact arm comprises:
a flange; and
a protruding part, which protrudes from the flange; and
the detection arm comprises a blocking part configured to block the space between the light-emitting device and the light-receiving device.

9. The tool according to claim 8, wherein:
the accessory comprises a cover that at least partially covers the tool accessory;
the housing comprises a cover-mounting part, on which the cover is mounted;
the sensor case is disposed, in the interior of the housing, proximal to a center portion of the housing in the left-right direction;
the sensor case is held by the housing such that the swing shaft is disposed in a left-right direction and the protruding part faces downward perpendicular to the left-right direction;
the contact arm protrudes to an exterior of the housing via a through hole in the housing; and
the flange and the protruding part are disposed, on outer portions of the housing, proximal to the cover-mounting part.

10. The tool according to claim 8, wherein:
the accessory comprises a handle, which is grippable by a user;
the housing has a handle-mounting hole in which the handle is mounted;
the sensor case is disposed in the interior of the housing;
the sensor case is held by the housing such that the swing shaft is disposed in an up-down direction and the protruding part opposes the handle-mounting hole; and
in a state in which the handle is not mounted in the handle-mounting hole, the flange makes contact with an inner surface of the housing and the protruding part is disposed in the handle-mounting hole.

11. The tool according to claim 8, wherein:

the link member is supported by the sensor case in a pivotable manner;

the link member is configured to pivot relative to the sensor case in response to the mounting and demounting of the accessory;

the prime mover is an electric motor;

a pivot shaft of the link member and the sensor device are aligned in a direction that is at least substantially orthogonal to an output shaft of the electric motor housed in the interior of the housing;

the pivot shaft of the link member is disposed in a second direction that is at least substantially orthogonal to a first direction, which is at least substantially parallel to a third direction, in which the output shaft of the electric motor extends; and the tool further comprises an elastic member, which biases the link member from the first position toward the second position.

12. The tool according to claim 8, wherein:

the link member is supported by the sensor case in a pivotable manner;

the link member is configured to pivot relative to the sensor case in response to the mounting and demounting of the accessory;

the prime mover is an electric motor;

a pivot shaft of the link member and the sensor device are aligned in a direction that is at least substantially orthogonal to an output shaft of the electric motor housed in the interior of the housing; and the detection sensor is disposed between the tool-accessory retaining part and the electric motor in a direction in which the output shaft of the electric motor extends.

13. The tool according to claim 8, comprising:

a plurality of the detection sensors; and a plurality of the link members corresponding to the plurality of the detection sensors;

wherein the accessory comprises a cover, which at least partially covers the tool accessory, and/or a handle that is grippable by the user.

14. A tool comprising:

a prime mover configured to rotate an output shaft extending in a front-rear direction of the tool;

a power-transmission mechanism operably connected to the output shaft;

a housing that houses the prime mover and the power-transmission mechanism;

a tool-accessory retaining part operably connected to the power-transmission mechanism, the tool-accessory retaining part being configured to hold a tool accessory;

an accessory mounted on the housing in a detachable manner;

a link member configured to move in response to mounting and demounting of the accessory; and a switching unit housed in an interior of the housing and configured to be switched, in response to movement of the link member, between a state in which the switching unit prohibits the prime mover from being driven and a state in which the switching unit allows the prime mover to be driven;

wherein:

the link member comprises a transmission member;

a frontmost end of the transmission member is disposed frontward of a frontmost end of the prime mover in the front-rear direction; and a rearmost end of the transmission member is disposed rearward of a rearmost end of the prime mover in the front-rear direction;

wherein the transmission member is a shaft that has a longitudinal axis extending in parallel with the output shaft;

the shaft is pivotable about the longitudinal axis of the shaft;

the switching unit is configured to be switched in response to pivotal movement of the shaft about the longitudinal axis of the shaft; and a frontmost end of the output shaft is disposed forward of the frontmost end of the shaft.

15. The tool according to claim 14, further comprising:

a control unit configured to control operation of the prime mover;

wherein the control unit is disposed rearward of the rearmost end of the prime mover in the front-rear direction.

16. The tool according to claim 14, wherein the prime mover is an electric motor.

17. The tool according to claim 16, further comprising a battery mounted on the housing in a detachable manner and supplying electric power to the electric motor.

18. The tool according to claim 14, wherein the accessory comprises a cover that at least partially covers the tool accessory or a handle that is grippable by a user.

19. The tool according to claim 14, wherein:

the prime mover is an electric motor; and the accessory comprises a cover that at least partially covers the tool accessory or a handle that is grippable by a user.

* * * * *